US011715950B2

(12) United States Patent
Miller et al.

(10) Patent No.: US 11,715,950 B2
(45) Date of Patent: Aug. 1, 2023

(54) SUSTAINABLE ENERGY PHYSICAL DELIVERY TRACKING AND VERIFICATION OF ACTUAL ENVIRONMENTAL IMPACT

(71) Applicant: ClearTrace Technologies, Inc., Austin, TX (US)

(72) Inventors: Eric Miller, Austin, TX (US); Neil Zumwalde, Austin, TX (US); Robert Astrich, Tijeras, NM (US); Brian Lakamp, Bedford, NY (US); Evan Caron, Houston, TX (US); Zachary Livingston, Austin, TX (US); Benjamin Grimes, Austin, TX (US); Troy Martin, Austin, TX (US)

(73) Assignee: ClearTrace Technologies, Inc., Austin, TX (US)

( * ) Notice: Subject to any disclaimer, the term of this patent is extended or adjusted under 35 U.S.C. 154(b) by 0 days.

(21) Appl. No.: 17/587,002

(22) Filed: Jan. 28, 2022

(65) Prior Publication Data
US 2022/0247174 A1    Aug. 4, 2022

Related U.S. Application Data

(60) Provisional application No. 63/162,682, filed on Mar. 18, 2021, provisional application No. 63/143,574, filed on Jan. 29, 2021.

(51) Int. Cl.
*H02J 3/00* (2006.01)
(52) U.S. Cl.
CPC ............. *H02J 3/003* (2020.01); *H02J 3/004* (2020.01); *H02J 3/0073* (2020.01)
(58) Field of Classification Search
CPC ........... H02J 3/003; H02J 3/004; H02J 3/0073
See application file for complete search history.

(56) References Cited

U.S. PATENT DOCUMENTS

| 4,309,569 A | 1/1982 | Merkle |
| 7,949,615 B2 | 5/2011 | Ehlers et al. |
| (Continued) | | |

FOREIGN PATENT DOCUMENTS

| AU | 2016904952 | 12/2016 |
| CN | 104901313 A | 9/2015 |
| (Continued) | | |

OTHER PUBLICATIONS

Andoni, et al, "Blockchain:s Crypto-control your own energy supply," Nature, vol. 548, No. 158, Aug. 2017, doi: 10.1038/548158b.

(Continued)

*Primary Examiner* — Charles R Kasenge
(74) *Attorney, Agent, or Firm* — Craige Thompson; Thompson Patent Law; Timothy D. Snowden

(57) ABSTRACT

Apparatus and associated methods relate to automatically load matching, in time, energy physically generated and transmitted to a consumption location across at least one tracking and processing infrastructure. In an illustrative example, a load pool (LP) may be created based on energy consumed at a physical location at one or more selected time periods. A generation pool (GP) may, for example, be created based on energy generated and physically available for consumption at the physical location during the time periods. Associations may be created, for example, between measurements in the GP of energy generated and transmitted and measurements in the LP of energy consumed. The associations may be created as a function of predetermined privileges associated with the consumption location and generation locations and/or physical transmission links corresponding to the GP during the time periods. Various embodiments may advantageously determine environmental impact based on location and time-based load matching.

20 Claims, 14 Drawing Sheets

(56) References Cited

U.S. PATENT DOCUMENTS

| | | | |
|---|---|---|---|
| 9,300,170 | B2 | 3/2016 | Omar et al. |
| 9,679,276 | B1 | 6/2017 | Cuende |
| 9,870,508 | B1 | 1/2018 | Hodgson et al. |
| 9,886,316 | B2 | 2/2018 | Belady et al. |
| 10,102,265 | B1 | 10/2018 | Madisetti et al. |
| 10,324,903 | B1 | 6/2019 | Goldberg et al. |
| 10,496,633 | B2 | 12/2019 | Pattanaik et al. |
| 10,506,104 | B1 | 12/2019 | Shakeri |
| 10,691,665 | B1 | 6/2020 | Zhang |
| 10,691,676 | B1 | 6/2020 | Zhang |
| 10,701,192 | B1 | 6/2020 | Yang |
| 10,789,396 | B1 | 9/2020 | Hoff |
| 10,831,902 | B2 | 11/2020 | Black et al. |
| 10,879,734 | B2 | 12/2020 | Waffner |
| 10,983,958 | B1 | 4/2021 | Miller et al. |
| 11,210,751 | B2 | 12/2021 | Anglin et al. |
| 11,544,788 | B1 | 1/2023 | Moy et al. |
| 2003/0041039 | A1 | 2/2003 | Spool et al. |
| 2003/0220720 | A1 | 11/2003 | Shimode et al. |
| 2010/0235008 | A1* | 9/2010 | Forbes, Jr. ............... B60L 53/65 700/297 |
| 2011/0137763 | A1 | 6/2011 | Aguilar |
| 2012/0042356 | A1* | 2/2012 | Kubota .................. G05B 15/02 726/2 |
| 2013/0274935 | A1 | 10/2013 | Deshpande et al. |
| 2013/0297084 | A1* | 11/2013 | Kubota ..................... H02J 3/14 700/286 |
| 2014/0052303 | A1* | 2/2014 | Venkatakrishnan ... G06Q 50/06 700/291 |
| 2016/0011616 | A1 | 1/2016 | Janous et al. |
| 2016/0035052 | A1 | 2/2016 | Tran |
| 2016/0110261 | A1 | 4/2016 | Parab et al. |
| 2016/0126734 | A1 | 5/2016 | Price et al. |
| 2016/0196623 | A1 | 7/2016 | Hoff |
| 2016/0284033 | A1 | 9/2016 | Winand et al. |
| 2017/0173262 | A1 | 6/2017 | Veltz |
| 2017/0206522 | A1 | 7/2017 | Schiatti et al. |
| 2017/0358041 | A1 | 12/2017 | Forbes, Jr. et al. |
| 2018/0117446 | A1 | 5/2018 | Tran et al. |
| 2018/0128863 | A1 | 5/2018 | Utsumi et al. |
| 2018/0232819 | A1 | 8/2018 | Stöcker et al. |
| 2018/0299852 | A1 | 10/2018 | Orsini |
| 2018/0330349 | A1 | 11/2018 | Uhr et al. |
| 2018/0349706 | A1 | 12/2018 | Hodgson et al. |
| 2019/0016419 | A1 | 1/2019 | Sheldon-Coulson et al. |
| 2019/0018888 | A1 | 1/2019 | Madisetti et al. |
| 2019/0086235 | A1 | 3/2019 | Cui et al. |
| 2019/0087920 | A1 | 3/2019 | Cui et al. |
| 2019/0089155 | A1 | 3/2019 | Cui et al. |
| 2019/0164236 | A1 | 5/2019 | Mayne et al. |
| 2019/0165931 | A1 | 5/2019 | Bharti et al. |
| 2019/0214848 | A1 | 7/2019 | Waffner |
| 2019/0236726 | A1 | 8/2019 | Unagami |
| 2019/0260573 | A1 | 8/2019 | Goto |
| 2019/0272601 | A1 | 9/2019 | Unagami et al. |
| 2019/0278805 | A1 | 9/2019 | Li |
| 2019/0287200 | A1 | 9/2019 | Schuler et al. |
| 2019/0295193 | A1 | 9/2019 | Winand et al. |
| 2019/0325430 | A1 | 10/2019 | Cui et al. |
| 2019/0339678 | A1 | 11/2019 | Biernat et al. |
| 2019/0353685 | A1 | 11/2019 | Cavoto et al. |
| 2019/0363892 | A1 | 11/2019 | Wang |
| 2019/0394021 | A1 | 12/2019 | Awad et al. |
| 2020/0027096 | A1 | 1/2020 | Cooner |
| 2020/0042989 | A1 | 2/2020 | Ramadoss et al. |
| 2020/0051186 | A1 | 2/2020 | Sarker et al. |
| 2020/0057417 | A1 | 2/2020 | Ping et al. |
| 2020/0064783 | A1 | 2/2020 | Tran et al. |
| 2020/0104888 | A1 | 4/2020 | Obradovic et al. |
| 2020/0106605 | A1 | 4/2020 | Mord et al. |
| 2020/0161858 | A1 | 5/2020 | Wang et al. |
| 2020/0210996 | A1 | 7/2020 | Edwards et al. |
| 2020/0225649 | A1 | 7/2020 | Cahill |
| 2020/0226741 | A1 | 7/2020 | Real et al. |
| 2020/0228342 | A1 | 7/2020 | Nixon et al. |
| 2020/0244470 | A1 | 7/2020 | Ruckriemen et al. |
| 2020/0273026 | A1 | 8/2020 | Soni et al. |
| 2020/0274389 | A1 | 8/2020 | Islam et al. |
| 2020/0302533 | A1 | 9/2020 | Yang |
| 2020/0320055 | A1 | 10/2020 | Zhang |
| 2020/0326679 | A1 | 10/2020 | Maher |
| 2020/0327537 | A1 | 10/2020 | Garg et al. |
| 2020/0327627 | A1 | 10/2020 | Chakraborty et al. |
| 2020/0380154 | A1 | 12/2020 | Jayachandran |
| 2020/0389312 | A1 | 12/2020 | Boneh et al. |
| 2020/0394181 | A1 | 12/2020 | Winarski |
| 2021/0003974 | A1 | 1/2021 | Yang et al. |
| 2021/0042748 | A1 | 2/2021 | Sepulveda et al. |
| 2021/0063983 | A1 | 3/2021 | Anderson et al. |
| 2021/0142426 | A1 | 5/2021 | Miller et al. |
| 2021/0182275 | A1 | 6/2021 | Su et al. |
| 2021/0217110 | A1 | 7/2021 | Anglin et al. |
| 2021/0319384 | A1 | 10/2021 | Wang et al. |

FOREIGN PATENT DOCUMENTS

| | | | |
|---|---|---|---|
| CN | 109167363 | A | 1/2019 |
| CN | 109245158 | A | 1/2019 |
| CN | 109268685 | A | 1/2019 |
| CN | 109377410 | A | 2/2019 |
| CN | 109755938 | A | 5/2019 |
| EP | 3772714 | A1 | 2/2021 |
| WO | 0223425 | A1 | 3/2002 |
| WO | 2014143908 | A1 | 9/2014 |
| WO | 2018032372 | A1 | 2/2018 |
| WO | 2020045357 | A1 | 3/2020 |
| WO | 2020074904 | A1 | 4/2020 |
| WO | 2020141175 | A2 | 7/2020 |
| WO | 2021168149 | A1 | 8/2021 |

OTHER PUBLICATIONS

Asad, H., "Microsoft Makes a New Commitment to Go 100/100/0 by 2030," Environment + Energy Leader, Jul. 14, 2021, retrieved from the internet Nov. 11, 2021, https://www.environmentalleader.com/2021/07/microsoft-announces-new-100-100-0-commitment-by-2030/.

Brasington, L. "Corporate Renewable Energy Procurement: Traceability and Energy Provenance," Apr. 22, 2020, retrieved from the internet Nov. 11, 2021, https://www.cleantech.com/corporate-renewable-energy-procurement-traceability-and-energy-provenance/.

Corradi, O., "How to trace back the origin of electricity," electricityMap, Apr. 19, 2021, retrieved from the internet Nov. 11, 2021, https://electricitymap.org/blog/flow-tracing/.

Enosi Energy, "Clean energy direct to you," Enosi Energy, Feb. 20, 2021, retrieved from the internet Nov. 11, 2021, https://web.archive.org/web/20210220224706/https://enosi.energy/.

Enosi Energy, "Frequently Asked Questions," Enosi Energy, retrieved from the internet Nov. 11, 2021, https://enosi.energy/faq/#faqPlatform.

Ferenczi, et al, "A Path to Solving the Complexity of Fractional RECs: Issuance, Transaction and Retirement (YouTube recording at: https://www.youtube.com/watch?v=a8HStfNJMjM)," presented at the A Path to Solving the Complexity of Fractional RECs: Issuance, Transaction and Retirement, Webinar, Sep. 8, 2021, retrieved from the Internet Nov. 11, 2021, https://www.mrets.org/wp-content/uploads/2021/09/A-Path-to-Solving-the-Complexity-of-Fractional-RECs-Issuance-Transaction-and-Retirement-9-8-2021.pdf.

FlexiDAO, "Collect energy-related data and certificates for Scope 2 reporting," FlexiDAO, retrieved from the internet Nov. 11, 2021, https://www.flexidao.com/respring-2/energy-certificates-collection.

FlexiDAO, "Increase the credibility of your green energy," FlexiDAO, retrieved from the internet Nov. 11, 2021, https://www.flexidao.com/energy-buyers/credibility-for-your-green-energy.

FlexiDAO, "Microsoft," FlexiDAO, retrieved from the internet Dec. 9, 2021, https://www.flexidao.com/case-studies/microsoft.

FlexiDAO, "Monitor your energy portfolio 'from source to socket' to increase your impact," FlexiDAO, retrieved from the internet Nov. 11, 2021, https://www.flexidao.com/respring-2/green-energy-software.

(56) References Cited

OTHER PUBLICATIONS

FlexiDAO, "Moving towards 24/7 Carbon-Free Energy," FlexiDAO, retrieved from the internet Nov. 11, 2021, https://www.fexidao.com/.
FlexiDAO, "RESpring: A Renewable Energy Monitoring Software for Corporate Energy Buyers," FlexiDAO, retrieved from the internet Nov. 11, 2021, https://www.flexidao.com/respring.
FlexiDAO, "The new way of buying renewable Energy" Wayback Machine, Jan. 23, 2021, retrieved from the internet Dec. 9, 2021, https://web.archive.org/web/20210123044206/https://www.flexidao.com/.
FlexiDAO, "The New Way of Buying Renewable Energy," Wayback Machine, Jan. 23, 2021, retrieved from the internet Dec. 9, 2021, https://web.archive.org/web/20210123043448/https://www.flexidao.com/respring#.
FlexiDAO, "What We Do," Wayback Machine, Jan. 11, 2019, retrieved from the internet Nov. 11, 2021, https://web.archive.org/web/20190111142900/https://www.flexidao.com/.
FlexiDAO, "What We Do," Wayback Machine, Nov. 16, 2018, retrieved from the internet Nov. 11, 2021, https://web.archive.org/web/20181116025201/https://www.flexidao.com/.
Serber, B. "A Path to Supporting Data-Driven Renewable Energy Markets," p. 26, Mar. 2021.
Google, "Moving toward 24x7 Carbon-Free Energy at Google Data Centers: Progress and Insights," Google, Progress Report, Oct. 2018, retrieved from the internet Nov. 11, 2021, https://storage.googleapis.com/gweb-sustainability.appspot.com/pdf/24x7-carbon-free-energy-data-centers.pdf.
Haun, A., "Schneider Electric Microgrid Solutions," Whitepaper, retrieved from the internet Nov. 11, 2021, https://www.michigan.gov/documents/mpsc/Microgrid_Solutions_2017_May_10_aah_pdf_568663_7.pdf.
J. Collell, "Energy Attribute Certificate vs. an Energy Traceability Software: What's the Difference?," FlexiDAO, Sep. 3, 2020, retrieved from the internet Dec. 9, 2021, https://www.flexidao.com/post/energy-attribute-certificate-vs-energy-traceability-software-whats-the-difference.
Lakamp, B., "The Carbon Bar," The Sustainability X® Magazine, Feb. 23, 2021, retrieved from the internet Nov. 11, 2021, https://medium.com/sustainability-x/net-zero-true-zero-and-carbon-free-2f32c77cdd72.
LevelTen Energy, "LevelTen Energy's Dynamic Matching Engine Enables Starbucks to Close on a Groundbreaking Three-Project Renewable Energy Portfolio," PRWeb, Jun. 5, 2019, retrieved from the internet Nov. 11, 2021, https://www.prweb.com/releases/levelten_energys_dynamic_matching_engine_enables_starbucks_to_close_on_a_groundbreaking_three_project_renewable_energy_portfolio/prweb16358133.htm.
Miller, G., "Beyond 100 % renewable: Policy and practical pathways to 24/7 renewable energy procurement," The Electricity Journal, vol. 33, No. 2, p. 106695, Mar. 2020, retrieved from the internet Nov. 11, 2021, https://doi: 10.1016/j.tej.2019.106695.
Orecchini, et al, "The Concept of Energy Traceability: Application to EV Electricity Charging by Res," Energy Procedia, vol. 82, pp. 637-644, Dec. 2015, doi: 10.1016/j.egypro.2015.12.014.
Papavasiliou, et al, "Integrating renewable energy contracts and wholesale dynamic pricing to serve aggregate flexible loads," in 2011 IEEE Power and Energy Society General Meeting, San Diego, CA, Jul. 2011, pp. 1-4. https://oren.ieor.berkeley.edu/pubs/aggregate.pdf.
PowerLedger, "PPA Vision," Wayback Machine, Dec. 19, 2019, retrieved from the internet Nov. 11, 2021, https://web.archive.org/web/20191219173739/https://www.powerledger.io/product/ppa-vision/.
PowerLedger, "Vision," PowerLedger.io, retrieved from the internet Nov. 11, 2021, https://www.powerledger.io/platform-features/vision.
Prosume S.r.l., "Energy Source Tracing," Prosume, retrieved from the internet Nov. 11, 2021, https://prosume.io/energy-source-tracing/.
Sornes, et al., "Analysis of the impact resolution has on load matching in the Norwegian context," Energy Procedia, vol. 132, pp. 610-615, Oct. 2017, doi: 10.1016/j.egypro.2017.09.683.
Tranberg, et al "Real-time carbon accounting method for the European electricity markets," Energy Strategy Reviews, vol. 26, p. 100367, Nov. 2019, doi: 10.1016/j.esr.2019.100367.
Vattenfall AB, "24/7 Matching—Vattenfall," Vattenfall, retrieved from the internet Nov. 11, 2021, https://www.vattenfall.se/foretag/miljo/24-7-matching/.
Vattenfall AB, "Vattenfall and Microsoft pilot world's first hourly matching (24/7) of renewable energy," Vattenfall, Nov. 20, 2019., retrieved from the internet Nov. 11, 2021, https://group.vattenfall.com/press-and-media/pressreleases/2019/vattenfall-and-microsoft-pilot-worlds-first-h-ourly-matching-247-of-renewable-energy.
Vattenfall AB, "Vattenfall supports Conapto's data centres with 24/7 electricity matching," Vattenfall, May 28, 2021, retrieved from the internet Nov. 11, 2021, https://group.vattenfall.com/press-and-media/pressreleases/2021/vattenfall-supports-conaptos-data-centres-with-247-electricity-matching.
Vattenfall AB, "Vattenfall to deliver renewable energy 24/7 to Microsoft s Swedish datacenters," Vattenfall, Nov. 24, 2020, retrieved from the internet Nov. 11, 2021, https://group.vattenfall.com/press-and-media/pressreleases/2020/vattenfall-to-deliver-renewable-energy-247-to-microsofts-swedish-datacenters.
WattTime, "Marginal Emissions Methodology," WattTime, retrieved from the internet Nov. 11, 2021, https://www.watttime.org/marginal-emissions-methodology/.
WattTime, "REsurety and WattTime partner to increase accessibility to high-quality marginal carbon emissions data," WattTime, Nov. 2, 2021, retrieved from the internet Nov. 11, 2021, https://www.watttime.org/news/resurety-and-watttime-partner-to-increase-accessibility-to-high-quality-marginal-carbon-emissions-data/.
WattTime, "The Power to Choose Clean Energy," WattTime, retrieved from the internet Nov. 11, 2021, https://www.watttime.org/.
Xia, V., "When 100% renewable energy doesn't mean zero carbon," Stanford Earth, May 23, 2019, retrieved from the internet Nov. 11, 2021, https://earth.stanford.edu/news/when-100-renewable-energy-doesnt-mean-zero-carbon.
Yang, et al., "Block-chain based Energy Tracing Method for Electric Vehicles Charging," in 2020 IEEE Sustainable Power and Energy Conference (iSPEC), Nov. 2020, pp. 2622-2627, retrieved from the internet, https://ieeexplore.ieee.org/document/9350999.
International Search Report and Written Opinion of the International Searching Authority in related International Application No. PCT/US2022/070400, dated May 16, 2022, 9 pages.
Alladi et al., "Blockchain in Smart Grids: A Review on Different Use Cases," Sensors (Basel), 2019, 19(22): 4862, Published Nov. 8, 2019, doi:10.3390/s19224862, 25 pages. (Year: 2019).
Anderson, Jared, Blockchain project to help JPMorgan reach 100% renewable energy goal, Jan. 14, 2020, accessed Sep. 22, 2020.
Andoni, et al, Blockchain technology in the energy sector: A systematic review of challenges and opportunities, Renewable and Sustainable Energy Reviews 100 (2019) 143-174, accessed Sep. 24, 2020, https://www.sciencedirect.com/science/article/pii/S1364032118307184?via%3Dihub.
FlexiDAO, "Collect energy-related data and certificates for Scope 2 reporting," retrieved from the internet Nov. 11, 2021, FlexiDAO. https://www.flexidao.com/respring-2/energy-certificates-collection.
FlexiDAO, "The New Way of Buying Renewable Energy," Wayback Machine, Jan. 23, 2021, retrieved from the internet Nov. 11, 2021, https://web.archive.org/web/20210123043448/https://www.flexidao.com/respring#.
FlexiDAO, "Unlocking New Digitized Energy Services" Wayback Machine, Jan. 23, 2021, retrieved from the internet Dec. 9, 2021, https://web.archive.org/web/20210123044206/https://www.flexidao.com/.
Google, "Moving toward 24x7 Carbon-Free Energy at Google Data Centers: Progress and Insights," Google, Progress Report, Oct. 2018, retrieved from the internet Nov. 11, 2021. [Online]. Available: https://storage.googleapis.com/gweb-sustainability.appspot.com/pdf/24x7-carbon-free-energy-data-centers.pdf.
Imbault, et al., "The Green Blockchain—Managing Decentralized Energy Production and Consumption," 2017 IEEE International

(56) References Cited

OTHER PUBLICATIONS

Conference on Environment and Electrical Engineering and 2017 IEEE Industrial and Commercial Power Systems Europe (EEEIC/I &CPS Europe), Jun. 6-9, 2017, 5 pages. (Year: 2017).

Jossi, Frank, Could blockchain make it easier to buy and sell renewable energy certificates?, Apr. 17, 2020, Energy News Network, accessed Sep. 22, 2020, https://energynews.us/2020/04/17/midwest/could-blockchain-make-it-easier-to-buy-and-sell-renewable-energy-certificates/.

Lee, Indiana, Renewable Energy and Blockchain, Energy Central, Apr. 3, 2020, accessed Sep. 22, 2020, https://energycentral.com/c/ee/renewable-energy-and-blockchain.

Maisch, Marija, Australian blockchain to trace renewable energy credits for Japanese utility, Dec. 12, 2019, PV Magazine, accessed Sep. 22, 2020, https://www.pv-magazine-australia.com/2019/12/12/australian-blockchain-to-track-renewable-energy-credits-for-japanese-utility/.

Martell, Alex, Hop on Board the Merkle Patricia Tr(ie)an, Mar. 26, 2019.

Pop et al., "Blockchain-Based Scalable and Tamper-Evident Solution for Registering Energy Data," Sensors 2019, 19, 3033, doi: 10.3390/S19143033, 21 pages. (Year: 2019).

Tu, Phan Son, Data structure in Ethereum | Episode 2: Radix trie and Merkle trie, Feb. 8, 2018, accessed Feb. 19, 2021, https://medium.com/coinmonks/data-structure-in-ethereum-episode-2-radix-trie-and-merkle-trie-d941d0bfd69a.

V. Xia, "When 100% renewable energy doesn't mean zero carbon," Stanford Earth, May 23, 2019, retrieved from the internet Nov. 11, 2021, https://earth.stanford.edu/news/when-100-renewable-energy-doesnt-mean-zero-carbon.

Volt Markets, Self Upgrading Contracts in Our Platform, Volt Markets, accessed Sep. 22, 2020 voltmarkets.com.

Walsh, N. "Achieving 100 percent renewable energy with 24/7 monitoring in Microsoft Sweden," Azure, Nov. 24, 2020, retrieved from the internet Nov. 11, 2021, https://azure.microsoft.com/en-us/blog/achieving-100-percent-renewable-energy-with-247-monitoring-in-microsoft-sweden/.

WattTime, "Powering the Future: Harnessing Industrial Demand Flexibility to Reduce Emissions and Integrate Renewables," WattTime, Oct. 2021, retrieved from the internet Nov. 11, 2021, https://www.watttime.org/app/uploads/2021/10/WattTime-HSC-Consumers-PoweringTheFutureIndustrialDemandFlexibility-202110-FULLREPORT-Updated.pdf.

Y. Yang, D. Peng, W. Wang, and X. Zhang, "Block-chain based Energy Tracing Method for Electric Vehicles Charging," in 2020 IEEE Sustainable Power and Energy Conference (iSPEC), Nov. 2020, pp. 2622-2627. doi: 10.1109/iSPEC50848.2020.9350999, retrieved from the internet Nov. 11, 2021, https://ieeexplore.ieee.org/abstract/document/9350999.

\* cited by examiner

SUSTAINABLE ENERGY PHYSICAL DELIVERY TRACKING AND VERIFICATION OF ACTUAL ENVIRONMENTAL IMPACT

CROSS-REFERENCE TO RELATED APPLICATIONS

This application claims the benefit of U.S. Application Ser. No. 63/143,574, titled "Dynamic Sustainable Energy Tracking System Utilizing Blockchain Technology and Merkle Trie Hashing Structure," filed by Eric Miller, et al., on Jan. 29, 2021.

This application also claims the benefit of U.S. Provisional Application Ser. No. 63/162,682, titled "Energy Source Profile Generation and Display," filed by Robert Astrich, et al., on Mar. 18, 2021.

This application incorporates the entire contents of the foregoing application(s) herein by reference.

The subject matter of this application may have common inventorship with and/or may be related to the subject matter of the following:

- U.S. Application Ser. No. 62/934,113, titled "Sustainable Energy Tracking System Utilizing Blockchain Technology and Merkle Tree Hashing Structure," filed by Eric Miller, et al., on Nov. 12, 2019;
- U.S. application Ser. No. 17/095,438, titled "Sustainable Energy Tracking System Utilizing Blockchain Technology and Merkle Tree Hashing Structure," filed by Eric Miller, et al., on Nov. 11, 2020; and
- U.S. application Ser. No. 17/104,369, titled "Sustainable Energy Tracking System Utilizing Blockchain Technology and Merkle Tree Hashing Structure," filed by Eric Miller, et al., on Nov. 25, 2020.

This application incorporates the entire contents of the foregoing application(s) herein by reference.

TECHNICAL FIELD

Various embodiments relate generally to energy tracking and processing.

BACKGROUND

Mankind has implemented energy generation, transmission, and consumption in various forms throughout history. For example, ancient civilizations have long made use of both wind and water energy to grind grain. More recently, mankind has discovered practical means of generating energy at one location for transmission to and consumption at remote locations.

Energy may be generated, transferred, and consumed in various forms including, for example, electrical and chemical (e.g., petroleum-based fuels). Electrical energy may be generated, for example, by unsustainable means such as fossil fuel combustion, and by renewable means such as, for example, solar, wind, thermal, and hydroelectric generation.

Organizations and governments may, for example, implement renewable energy initiatives to encourage or require generation and consumption of renewable energy. Such initiatives may include, for example, standards for generation and use of renewable energy, rewards for progress towards full use of renewable energy, and fines associated with a failure to achieve satisfactory progress towards fully sustainable energy use. Accordingly, various entities including governments, organizations, and energy consumers may desire to record and track energy generation, transmission, and consumption data.

SUMMARY

Apparatus and associated methods relate to automatically load matching, in time, energy physically generated and transmitted to a consumption location across at least one tracking and processing infrastructure. In an illustrative example, a load pool (LP) may be created based on energy consumed at a physical location at one or more selected time periods. A generation pool (GP) may, for example, be created based on energy generated and physically available for consumption at the physical location during the time periods. Associations may be created, for example, between measurements in the GP of energy generated and transmitted and measurements in the LP of energy consumed. The associations may be created as a function of predetermined privileges associated with the consumption location and generation locations and/or physical transmission links corresponding to the GP during the time periods. Various embodiments may advantageously determine environmental impact based on location and time-based load matching.

Various embodiments may achieve one or more advantages. For example, some embodiments may advantageously provide a technical solution to a problem of creating data structures associating energy consumption with energy generation based on physical generation and physical availability (via a physical transmission link(s)) during a selected time interval(s). Various implementations disclosed herein may advantageously automatically associate energy physically measured as generated and transmitted to a physical location with energy physically measured as consumed in the physical location based on predetermined permissions and attribution prioritization rules.

Energy tracking and processing infrastructure(s) disclosed herein may, for example, advantageously allow time distributed consumption and generation profiles to be dynamically and selectively matched across a plurality of generation and consumption facilities. For example, some embodiments may advantageously solve a technical problem in energy networks of dynamically and selectively matching consumption from a portfolio of consumption facilities to (sustainable) energy generated by one or more (sustainable) energy generation facilities.

Various embodiments may advantageously enable attribution of a single energy generation data record (EGDR) to a plurality of consumption record(s) and/or energy assets. Various embodiments may advantageously allow attribution of a plurality of EGDRs (e.g., from a plurality of generation facilities) to a single energy consumption quantum.

Various embodiments may, for example, advantageously track, process, and validate physical energy generation, transmission, and consumption data. For example, various such implementations may advantageously enable a user to determine a source profile for one or more consumption facilities across one or more time periods.

Various embodiments may, for example, advantageously generate secure, immutable, verifiable digital energy data assets such as, by way of example and not limitation, blockchain tokens. Such tokens may, for example, advantageously provide negotiable instruments representing, by way of example and not limitation, physical energy quanta, carbon intensity, environmental impact, energy efficiency, other appropriate energy-related attributes, or some combination thereof. For example, digital asset tokens may be used to advantageously securely track and attribute sustainable energy generation and usage, for the beneficial purpose of powering and supporting various green energy-focused technological systems and processes (often referred to as "Green-Tech").

Various embodiments may advantageously transform a computer system into a dynamic visualization system measuring environmental impact of an energy consumption location(s). For example, various embodiments may advantageously enable a user to quickly visualize energy consumption at a physical location(s) that is load matched based on energy physically generated and available for consumption at the consumption location(s) during a selected time interval(s) based on predetermined permissions. For example, various implementations may advantageously provide a technical solution to technical problems of measuring and/or generating visualizations of environmental impact based on physical availability of energy consumed during one or more time periods. Some such embodiments may, for example, transform computing systems (e.g., general purpose computers) into inter-energy-distribution-network environmental impact meters. Accordingly, various embodiments may, by way of example and not limitation, advantageously facilitate users viewing, negotiating, and verifying production, transmission, and consumption of energy quanta and digital energy data assets generated therefrom.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, a physical energy load matching and environmental impact system is introduced with reference to FIGS. 1-2. Second, that introduction leads into a description with reference to FIGS. 3-4 of some exemplary embodiments of gen-transmit-consume (GTC) attribution engine(s). Third, with reference to FIGS. 5-9, exemplary methods of time- and physical availability-based attribution of energy and determination of environmental impact is described in application to exemplary GTC attribution engine(s). Fourth, with reference to FIGS. 10-14, the discussion turns to exemplary attribution and environmental impact visualizations. Finally, the document discusses further embodiments, exemplary applications and aspects relating to GTC attribution engine(s) and time- and physical availability-based attribution of energy consumption and determination of environmental impact.

Figure 1:
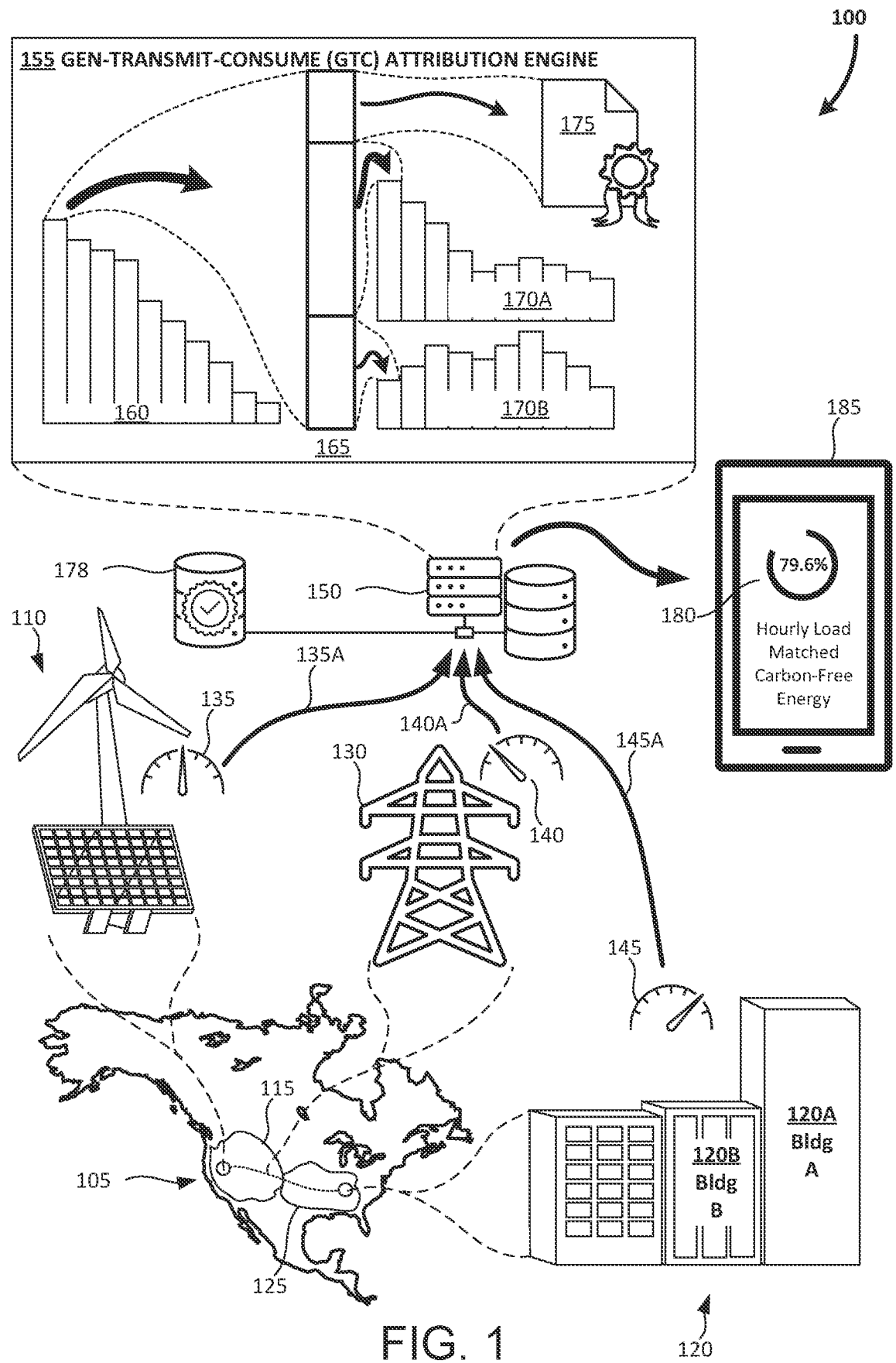
FIG. 1 depicts an exemplary generate-transmit-consume (GTC) attribution engine employed in an illustrative use-case scenario of energy generation, transmission, and consumption across physical energy infrastructures.

FIG. 1 depicts an exemplary generate-transmit-consume (GTC) attribution engine employed in an illustrative use-case scenario of energy generation, transmission, and consumption across physical energy infrastructures. In a depicted energy generation, consumption, and tracking and processing system 100 distributed across a geographical region 105, an energy generation facility 110 is located in a first energy distribution zone 115. An energy consumption facility 120 is located in a second energy distribution zone 125. The generation facility 110 is physically connected to the energy consumption facilities 120 by a physical transmission link 130 such that energy generated by the generation facility 110 may be physically made available to the energy consumption facilities 120 for consumption.

In some implementations, the physical transmission link 130 may, by way of example and not limitation, include one or more physical transmission lines, distribution networks, transformer stations, or some combination thereof. In some embodiments, for example, the first energy distribution zone 115 and/or the second energy distribution zone 125 may be operated by a transmission system operator (TSO) (e.g., electric system operator, independent system operator (ISO), regional transmission operator (RTO)). Energy may be transmitted, for example, from one or more generators (e.g., the generation facility 110) across one or more physical transmission links (e.g., physical transmission link 130) to one or more consumption locations (e.g., energy consumption facilities 120).

In the depicted example, a generation meter 135 measures quanta of energy generated during (predetermined) time intervals by the generation facility 110 and generates a corresponding generation data stream 135A from the generation facility 110. A transmission metering engine 140 determines (e.g., measures, records, associates) quanta of energy transmitted during (predetermined) time intervals via the physical transmission link 130 and generates a corresponding transmission data stream 140A. As depicted, a consumption meter 145 measures quanta of energy consumed during (predetermined) time intervals by the energy consumption facilities 120 and generates corresponding consumption data streams 145A. In some implementations, the corresponding transmission data stream 140A may, for example, include energy scheduled for delivery onto a power grid. The corresponding transmission data stream 140A may, for example, include energy transferred between networks (e.g., between the first energy distribution zone 115 and the second energy distribution zone 125). The corresponding transmission data stream 140A may, for example, include measurements of actual energy transmitted through at least one point in a power grid. In some implementations, the corresponding transmission data stream 140A may, by way of example and not limitation, include transaction records between generators and system operators.

The generation meter 135, the transmission metering engine 140, and the consumption meter 145 are operably coupled to an energy tracking and processing infrastructure (an ETPI 150). As depicted, the ETPI 150 includes at least one server (e.g., including processor(s)) and at least one data store. The ETPI 150 receives the generation data stream 135A, the corresponding transmission data stream 140A, and the consumption data streams 145A. The ETPI 150 includes a GTC attribution engine 155. The GTC attribution engine 155 operates on the generation data stream 135A, the corresponding transmission data stream 140A, and the consumption data streams 145A to perform load matching operations to attribute, in one or more selected time intervals, quanta of energy physically consumed by the energy consumption facilities 120 with quanta of energy physically generated at the generation facility 110 and available to the first energy distribution zone 115 via the physical transmission link 130 during corresponding time interval(s). Accordingly, the GTC attribution engine 155 may advantageously provide a technical solution to a problem of creating data structures associating energy consumption with energy generation based on physical generation and physical availability (via a physical transmission link(s)) during a selected time interval(s).

In the context of an electrical distribution system such as depicted in processing system 100, for example, although an actual electron may not physically travel from the generation facility 110 across the physical transmission link 130 to the energy consumption facilities 120, for example, the generation facility 110 may be physically responsible for generating a measurable quantum of energy in a given time interval. The physical transmission link 130 may be physically responsible for physically linking the generation facility 110 to the energy consumption facilities 120 and physically transmitting a measurable quantum of energy in the given time interval. The energy consumption facilities 120 may be physically responsible for expending (e.g., consuming) a measurable quantum of energy in the given time interval. Accordingly, the energy consumption facilities 120 may have an environmental impact based not only on energy consumed but also based on physical generation and transmission of energy to the energy consumption facilities 120 during the time interval(s) of consumption.

In various embodiments, a transmission metering engine 140 may determine quanta of energy transmitted (e.g., from a first point to a second point, onto a physical transmission link, off of a physical transmission link). A transmission metering engine 140 may include, for example, one or more scheduling and/or transactional computing systems. In some embodiments, multiple transmission metering engines may cooperate to generate one or more streams of transmission data (e.g., corresponding transmission data stream 140A) corresponding to one or more physical transmission links. By way of example and not limitation, the corresponding transmission data stream 140A may include scheduling records generated by an ISO. In some embodiments, the corresponding transmission data stream 140A may, for example, include scheduling records generated by physical scheduling systems (e.g., used by generation companies and/or their scheduling teams). The transmission data stream 140A may, for example, be generated based on TSO records. The transmission data stream 140A may, for example, be generated based on scheduling records. The transmission data stream 140A may, by way of example and not limitation, be generated based on settlement records.

As an illustrative example, a physical scheduling system may be offered by and/or may follow standards created by Open Access Technology International, Inc., (Minneapolis, Minn.). In various embodiments, for example, the corresponding transmission data stream 140A may be at least partially generated based on digital records of scheduling corresponding to energy quanta generated and scheduled to be transmitted on a specified physical transmission link. As an illustrative example, the corresponding transmission data stream 140A may be generated at least partially based on, and/or may include, an internal bilateral transaction record (IBT). In some embodiments, by way of example and not limitation, the corresponding transmission data stream 140A may be generated at least partially based on, and/or may include, a reference number (e.g., an E-Tag, a North American Electric Reliability Corporation (NERC) tag) identifying at least two parties corresponding to a scheduled energy transaction). The corresponding transmission data stream 140A may include indications of parties involved in transmission, time of transmission. Accordingly, various embodiments may advantageously correlate quanta of energy transmitted to quanta of energy generated and/or consumed in a corresponding time interval(s).

In the depicted example, over a discrete period of time (e.g., hour, day, week, month, year, user-defined time period) the GTC attribution engine 155 generates, from the generation data stream 135A, a generation profile 160 of energy generation quantum/quanta per subunit of time (e.g., 5-minute increments, hourly increments, daily increments). In some implementations, the generation profile 160 may, for example, be implemented as a 'generation pool' (or 'gen pool,' 'generation lake,' 'gen lake') of physical energy generated. A gen pool may, for example, be generated based on physical energy generated and available for consumption at a given location(s). For example, a gen pool may be generated for the second energy distribution zone 125 based on energy physically generated (e.g., as determined from the generation data stream 135A) and physically made available in the second energy distribution zone 125 (e.g., by a physical transmission link). The energy physically made available may, by way of example and not limitation, be from a generation facility in the second energy distribution zone 125 (e.g., determined from energy scheduled onto the second energy distribution zone 125 by an energy generation facility physically located in the second energy distribution zone 125). For example, a physical transmission link may be determined as existing based on a consumption location and a generation location being in the same distribution zone. The energy physically made available may, by way of example and not limitation, be via a physical transmission link (e.g., the physical transmission link 130) from another zone (e.g., from first energy distribution zone 115). Accordingly, as an illustrative example, a gen pool may, for example, be generated by the GTC attribution engine 155 based on the generation data stream 135A (e.g., representing energy physically generated) and the corresponding transmission data stream 140A (e.g., representing energy physically available in the second energy distribution zone 125). In some implementations, for example, the generation profile 160 may represent a generation profile for a specific physical region (e.g., a specific TSO network).

In the depicted example, the consumption data streams 145A from the energy consumption facilities 120 include measured quanta of energy consumed from a first building 120A and a second building 120B. The GTC attribution engine 155 generates, from the consumption data streams 145A, a consumption profile 170A and a consumption profile 170B for building 120A and building 120B, respectively. Each consumption profile 170 includes energy consumption quantum/quanta per subunit of time. The generation data stream 135A and the consumption data streams 145A may, by way of example and not limitation, be generated by associated metering equipment (e.g., generation meter 135, consumption meter 145, respectively).

In some implementations, the consumption profile 170A and the consumption profile 170B may, for example, be implemented as a 'load pool' (or 'load lake') of physical energy consumed. A load pool may, for example, be generated based on physical energy consumed at a given location(s). For example, a load pool may be generated for the second energy distribution zone 125 based on energy physically consumed within the second energy distribution zone 125 within a selected time interval. The load pool may be determined, for example, based on the location of the energy consumption facilities 120 and the consumption data streams 145A (e.g., including data corresponding to quanta of energy consumed, such as measured by the consumption meter(s) 145).

In the depicted example, for a predetermined time period, the GTC attribution engine 155 selects an energy generation data record (depicted as an EGDR 165) corresponding to the energy quantum generated by the generation facility 110 during that time period and physically available to the energy consumption facilities 120 by a physical transmission link (e.g., physical transmission link 130). The GTC attribution engine 155 then matches consumption profiles 170 (e.g., referencing associated energy consumption data records (ECDRs), not shown) per unit time against the available EGDRs 165. The GTC attribution engine 155 may, for example, generate a (digital) data structure associating the EGDR 165 with the profile(s) 170, and/or with transmission data (e.g., corresponding transmission data stream 140A, such as if available). In some embodiments, for example, the data structure(s) may include metadata. In some embodiments the data structure(s) may, for example, include database records.

As depicted, any EGDR 165 corresponding to a first time period in the generation profile 160 is used to match to both consumption profile 170A of building 120A and consumption profile 170B of building 120B. The process is continued across the entire generation and consumption profiles until all consumption is matched to corresponding EGDRs representing time-matched energy generation data. Once consumption and generation matching is complete, any remaining energy in the EGDRs 165 may be used, as depicted, to generate digital energy assets 175 (e.g., digital renewable energy credits (RECs)). Accordingly, the energy tracking and processing infrastructure may advantageously allow time distributed consumption and generation profiles to be dynamically and selectively matched across a plurality of generation and consumption facilities. For example, the ETPI 150 may advantageously solve a technical problem in energy networks of dynamically and selectively matching consumption from a portfolio of consumption facilities (e.g., building 120A, building 120B) to sustainable energy generated by one or more sustainable energy generation facilities 110.

In the depicted example, the ETPI 150 is operably coupled to a permissions module 178. The permissions module 178 may, for example, include at least one data store storing predetermined permissions. The GTC attribution engine 155 may, for example, be operably coupled to retrieve predetermined permissions from the permissions module 178. The GTC attribution engine 155 may, for example, select the EGDR 165 and/or generate the generation profile 160, the consumption profile 170A, the consumption profile 170B, and/or the digital energy assets 175 based on predetermined permissions retrieved from the permissions module 178.

As an illustrative example, the GTC attribution engine 155 may generate the gen pool for the second energy distribution zone 125 at least based on the generation data stream 135A and the corresponding transmission data stream 140A. The GTC attribution engine 155 may generate the load pool for the second energy distribution zone 125 based at least on the consumption data streams 145A. The GTC attribution engine 155 may match energy quanta, in a selected time interval from the load pool to energy quanta in the gen pool associated with a corresponding time interval based on one or more predetermined permissions. For example, a first predetermined permission may be associated with the energy consumption facilities 120 and the generation facility 110. The first predetermined permission may, by way of example and not limitation, be generated and stored in the permissions module 178 based on a supply contract (e.g., a power purchase agreement (PPA)) between the generation facility 110 and the energy consumption facilities 120. The first predetermined permission may, by way of illustration, define energy attributes (e.g., solar energy, wind energy). The first predetermined permission may, for example, define energy quantity (e.g., percentage of load, megawatt-hours (MWh)). The first predetermined permission may, for example, define energy time (e.g., per day, per hour, per month, as needed). The first predetermined permission may, for example, define location attributes (e.g., energy to be scheduled for delivery onto the second energy distribution zone 125).

A second predetermined permission may, for example, be associated with the energy consumption facilities 120 and the physical transmission link 130. The second predetermined permission may, for example, be generated and stored in the permissions module 178 at least partially based on a service contract between the energy consumption facilities 120 and an energy provider (e.g., a retail energy provider, a wholesale energy provider). The second predetermined permission may, for example, be generated and stored at least partially based on a service contract between an energy provider and the physical transmission link 130. The second predetermined permission may, by way of example and not limitation, be generated and stored in the permissions module 178 based on a service contract between the physical transmission link 130 and the energy consumption facilities 120. The second predetermined permission may, for example, define attributes related to the right of energy consumption facilities 120 to access energy available via the physical transmission link 130 (e.g., in the second energy distribution zone 125).

In various embodiments the energy tracking and processing infrastructure may implement Merkle trie and blockchain technology to create secure, traceable, and immutable EGDRs 165. Various embodiments may advantageously enable attribution of a single EGDR 165 to a plurality of consumption and/or energy assets (e.g., digital energy assets 175). Various embodiments may advantageously allow attribution of a plurality of EGDRs 165 (e.g., from a plurality of generation facilities 110) to a single energy consumption quantum.

The ETPI 150 (e.g., via the GTC attribution engine 155) may determine an environmental impact of the energy consumption facilities 120 (e.g., the building 120A, the building 120B). The ETPI 150 may generate an environmental impact indicium (EII) according to predetermined impact rules as a function of the attribution of the consumption profile(s) 170 to energy physical generated and available in corresponding time intervals (e.g., from the generation profile 160). As an illustrative example, the generation facility 110 may be a 'green energy' generator (e.g., carbon free energy). If it is determined that all the energy consumed by building 120B in a given time interval was physically generated by the generation facility 110, was physically available to the building 120B via the physical transmission link 130, and the building 120B was associated with a predetermined permission to consume the energy generated and transmitted, then the ETPI 150 may generate an EII corresponding to a complete load match to verified carbon-free energy (e.g., net zero carbon footprint).

Continuing the illustrative example, if, in the same time interval, building 120A was not fully load matched to carbon free energy (e.g., insufficient energy was generated by the generation facility 110, insufficient energy was transmitted via the physical transmission link 130, the building 120A was not associated with a predetermined privilege for energy generated and available), then the ETPI 150 may generate a corresponding EII associated with an incomplete load match to verified carbon-free energy (e.g., net carbon footprint greater than zero).

A human readable indicator may, for example, be generated and displayed based on the EII(s). In the depicted example, visual indicia 180 of dynamic energy source profile(s) over predefined time(s) and/or location(s) are displayed in an exemplary user interface 185. The visual indicia may be presented, as depicted, on a physical display device (e.g., tablet, computer screen, smartphone display). Accordingly, various embodiments may advantageously transform a computer system into a dynamic visualization system measuring environmental impact of an energy consumption location(s). For example, various embodiments may advantageously enable a user to quickly visualize energy consumption at a physical location(s) that is load matched based on energy physically generated and available for consumption at the consumption location(s) during a selected time interval(s) based on predetermined permissions. Various implementations may, by way of example and not limitation, advantageously provide a technical solution to technical problems of measuring and/or generating visualizations of environmental impact based on physical availability of energy consumed during one or more time periods. Some such embodiments may, for example, transform computing systems (e.g., general purpose computers) into inter-energy-distribution-network environmental impact meters.

The visual indicia 180 may, for example, provide a display indicating association of a generation profile(s) 160 to consumption profile(s) 170 corresponding in time and/or geography. The visual indicia 180 may, for example, provide a display indicating association of a consumption profile(s) 170 with time-matched and/or location-matched EGDRs 165 and/or digital energy asset(s) 175. The visual indicia 180 may, for example, provide a display indicating association of consumption profile(s) 170 with location-matched and/or gross time-matched energy sources (e.g., EGDRs 165, digital energy assets 175). The visual indicia 180 may, for example, provide a display indicating association of a consumption profile 170 with gross balance matching from bulk time energy sources. Accordingly, a user may advantageously determine a source profile for one or more consumption facilities across one or more time periods.

Figure 2:
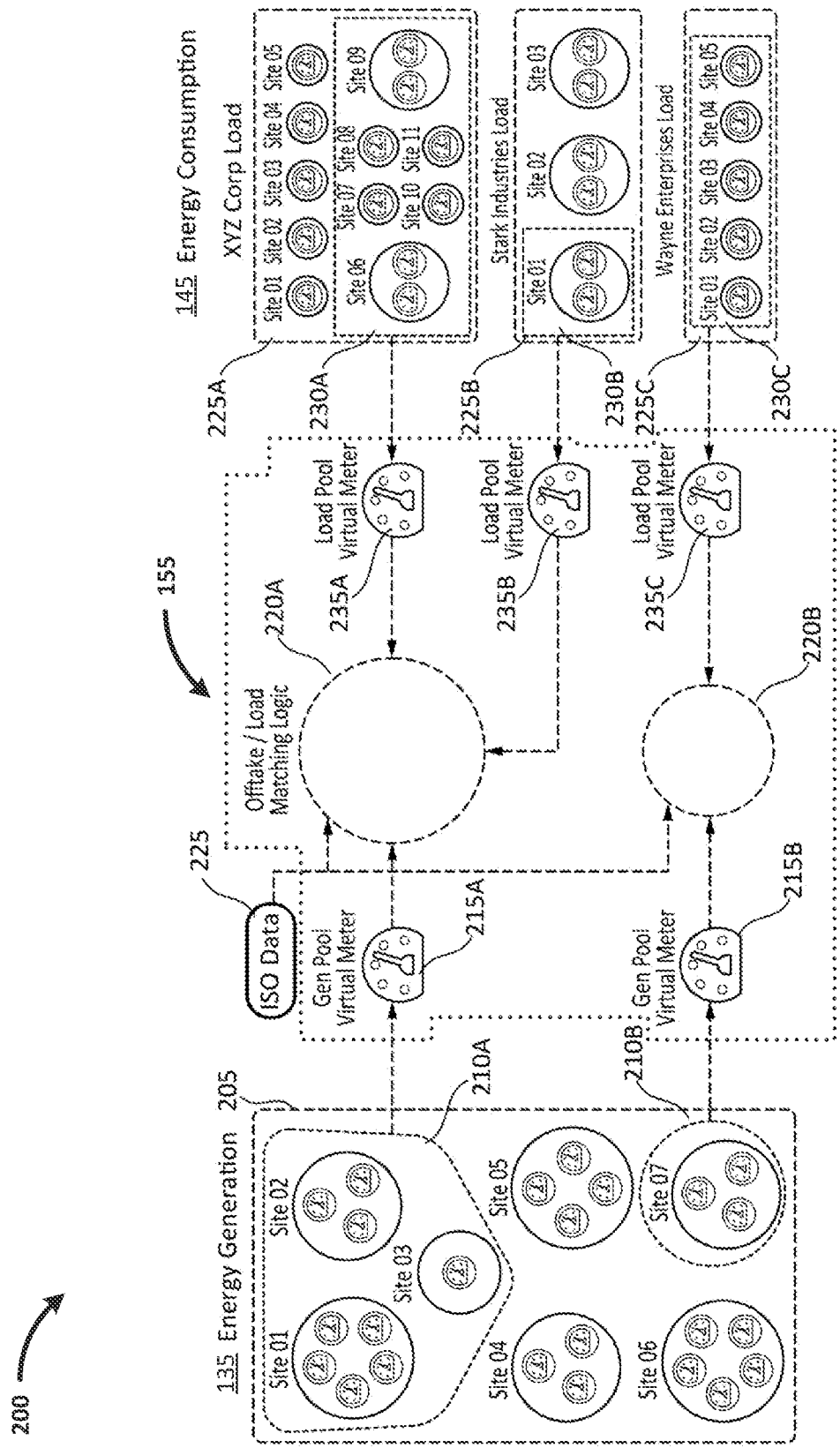
FIG. 2 depicts a block diagram of an exemplary energy tracking and processing infrastructure represented in an energy source profile display.

FIG. 2 depicts a block diagram of an exemplary energy tracking and processing infrastructure represented in an energy source profile display. In the depicted example infrastructure 200, generation meter 135 corresponds to a single supplier 205 having meters across seven energy generation sites (Sites 01-07). Energy generation data (e.g., generation data stream 135A) corresponding to a generation group 210A are received from nine meters of Sites 01-03 through a generation pool virtual meter 215A of the GTC attribution engine 155 into a load matching logic lake 220A. The energy generation data may, for example, be received into the logic lake 220A as energy generation data records (EGDRs).

In the depicted example, consumption meter 145 corresponds to three consumers (XYZ Corp 225A, Stark Industries 225B, and Wayne Enterprises 225C) having nineteen consumption meters (blue) and five on-site generation meters (yellow) across nineteen energy consumption sites (Sites 01-09, Sites 01-03, and Sites 01-05, respectively). Energy consumption data and on-site generation data corresponding to a consumption group 230A are received for XYZ Corp 225A into the load matching logic lake 220A of the GTC attribution engine 155 via a load pool virtual meter 235A from six consumption meters and two on site generation meters. Energy consumption data and on-site generation data corresponding to a consumption group 230B is received for Stark Industries from one consumption meter and one on-site generation meter through a load pool virtual meter 235B into the load matching logic lake 220A.

Similarly, energy generation data corresponding to a generation group 210B are received from three meters of Site 07 through a generation pool virtual meter 215B into a load matching logic lake 220B. Energy consumption data for five sites (Sites 01-05) corresponding to a consumption group 230C of Wayne Enterprises are received from five consumption meters into the load matching logic lake 220B via a load pool virtual meter 235C.

The energy generation data and consumption data received into the load matching logic lakes 220A and 220B may, for example, be used to create time-distributed energy generation profile(s) 160 corresponding to energy generation and/or energy consumption profile(s) 170 corresponding to energy consumption. Transmission data 225 (labeled as "ISO data" for illustrative purposes) are received into the load matching logic lakes 220A and 220B of the GTC attribution engine 155. In some implementations, the Transmission data 225 may correspond to the stream 140A as disclosed at least with reference to FIG. 1. The transmission data 225 may be received from, by way of example and not limitation, ISOs and/or other transmission and/or settlement entities. The transmission data 225 may, for example, be used to provide time and/or geographic transmission and scheduling data for energy generation and/or consumption records. For example, in various embodiments, the transmission data 225 may be used to determine energy generation data corresponding to consumption data, with proof of the scheduling and transmission of energy generation, for example, for predetermined time increments for one or more locations. Accordingly, various embodiments may use the transmission data 225 to generate and/or associate energy generation profiles 160 and/or energy consumption profiles 170.

In various embodiments virtual meters (e.g., generation pool virtual meter 215A, generation pool virtual meter 215B, load pool virtual meter 235A, load pool virtual meter 235B) may, for example, aggregate and/or divide records from at least one respective stream (e.g., generation, consumption) into predetermined quanta of energy (e.g., kWh, MWh), aggregate and/or divide records from at least one respective stream in predetermined time increments (e.g., hourly records), or some combination thereof. Accordingly, the load matching logic lakes 220 may, for example, contain energy generation profiles 160 and energy consumption profiles 170 for one or more associated generation and consumption facilities. An energy source profile generation system may, for example, generate one or more source profiles associating energy consumption profile(s) 170 and energy generation profile(s) 160 based on, by way of example and not limitation, time, geography, or some combination thereof.

The GTC attribution engine 155 may further apply predetermined permissions (e.g., from permissions module 178) to the logic lake 220A and/or the logic lake 220B to determine load matching between the load pool(s) and the gen pool(s).

In various embodiments, a gen pool may be created based on a physical region (e.g., TSO region) in which energy was generated. A gen pool may, for example, be defined by a physical distribution region (e.g., propane distribution infrastructure, electricity grid). The gen pool may, for example, be subdivided into (sub) gen pools. For example, in some embodiments (sub) gen pools may be generated based on predetermined data structures (e.g., associated with generation entities) defining geographical boundaries and/or physical generation facilities within a greater physical region. For example, a (sub) gen pool may be associated with a given energy generation entity (e.g., a single owner and/or operator of the facilities). As an illustrative example, within a (sub) gen pool associated with a single entity, further (sub) gen pool(s) may be defined, such as based on the entity's grouping(s) of facilities in the greater physical region. Grouping may, for example, be by priority. Grouping may, for example, be by (governmental) jurisdiction. Grouping may, for example, be by facility type (e.g., solar, wind, coal, gas, water). Grouping may, for example, be by location. One or more predetermined permissions may be associated with each gen pool. For example, predetermined data structures may define predetermined permission(s) associated with one or more gen pools. In some embodiments, a data structure(s) defining a gen pool(s) may, for example, define predetermined prioritization rules (e.g., static priority, dynamic priority) individual assets (e.g., consumption facilities) within the gen pool(s).

In various embodiments, a load pool may be created based on a physical region in which energy was consumed (e.g., TSO region). A load pool may, for example, be defined by a physical distribution region (e.g., propane distribution infrastructure, electricity grid). The load pool may, for example, be subdivided into load pools. For example, in some embodiments (sub) load pools may be generated based on predetermined data structures (e.g., associated with consumption entities) defining geographical boundaries and/or physical consumption facilities within a greater physical region. For example, a (sub) load pool may be associated with a given energy consumption entity (e.g., a single owner and/or operator of the facilities). As an illustrative example, within a (sub) load pool associated with a single entity, further (sub) load pool(s) may be defined based on the entity's grouping(s) of facilities in the greater physical region. Grouping may, for example, be by priority. Grouping may, for example, be by (governmental) jurisdiction. Grouping may, for example, be by facility type. Grouping may, for example, be by location. Load pool(s) and/or gen pool(s) may, for example, be defined by and stored in one or more predetermined data structures. One or more predetermined data structures may define predetermined permission(s) associated with one or more load pools. In some implementations, a data structure may associate a predetermined permission with both corresponding gen pool(s) and corresponding load pool(s). In some embodiments, a data structure(s) defining a load pool(s) may, for example, define predetermined prioritization rules (e.g., static priority, dynamic priority) individual assets (e.g., consumption facilities) within the load pool(s).

The GTC attribution engine 155 may, for example, match energy between a load pool and a corresponding gen pool (e.g., corresponding based on physical location) based on predetermined permission(s) (e.g., corresponding to predetermined offtake agreement(s)) associated with both the gen pool and the load pool. Predetermined priorities may, for example, be applied to determine an order of attribution of energy quanta from the gen pool to individual consumption quanta (e.g., determined based on ECDRs) in the load pool for a given time period. Accordingly, various embodiments may advantageously automatically associate energy physically measured as generated and transmitted to a physical location with energy physically measured as consumed in the physical location based on predetermined permissions and attribution prioritization rules.

In various embodiments, predetermined permissions may, for example, include one or more predetermined permission types. By way of example and not limitation, a predetermined permission associated with at least one generation facility and at least one consumption facility may correspond to a full requirements permission type (FRPT). An FRPT permission may be applied by a GTC attribution engine 155, for example, by matching all energy consumed by a corresponding consumption facility with energy available in the physical region corresponding to the consumption facility transmitted from a generation facility associated with the generator(s).

A predetermined permission associated with at least one generation facility and at least one consumption facility may, by way of example and not limitation, correspond to a fixed volume permission type (FVPT). An FVPT permission may, for example, define a volume(s) of energy permitted to be used by the associated consumption location(s). The FVPT permission may, for example, further define a corresponding time interval(s) (e.g., hour of day, day of week, day of month) for the volume(s). The FVPT permission may, for example, be applied by the GTC attribution engine 155 by matching all energy consumed by a corresponding consumption facility in a selected time interval(s)—and available in the physical region of the consumption facility—up to a maximum defined for the selected time interval(s) by the permission regardless of excess physically available and consumed.

A predetermined permission associated with at least one generation facility and at least one consumption facility may, by way of example and not limitation, correspond to a generation slice permission type (GSPT). A GSPT permission may, for example, define a percentage of energy generated by a facility(ies) is permitted to be used by the associated consumption location(s). The GSPT permission may, for example, be applied by the GTC attribution engine 155 by matching all energy consumed by a corresponding consumption facility in a selected time interval(s)—and available in the physical region of the consumption facility—up to a percentage of energy generated by the corresponding generation facility(ies) during the selected time interval(s).

In various embodiments, energy, physically available and associated with permission to consume, in excess of actual consumption by a corresponding consumption location(s) may, by way of example and not limitation, be made available for attribution (e.g., purchased) with unmatched energy consumption. The unmatched energy consumption (e.g., at another consumption facility) may be matched to one or more facilities to which the unmatched available generated energy was also physically available (e.g., on a same power grid).

Various such embodiments may, by way of example and not limitation, generate a permission and associate it with the gen pool(s) containing the unmatched generation physically available and associate it with the load pool(s) containing the unmatched consumption. The permission may be generated, for example, in response to a purchase of the unmatched generation from the generator. The permission may, for example, be generated in response to a purchase of (a right to claim) the unmatched generation from a consumer who already purchased the generated energy and/or a right to claim the generated energy. The permission may be generated, for example, in response to presentation of proof of right to consume the unmatched energy. Accordingly, various embodiments may advantageously provide post-facto proof of right to claim attributes (e.g., environmental impact attributes) of generated energy based at least partially, for example, on actual physical availability of the generated energy to the (secondary) claimant/purchaser.

Figure 3:
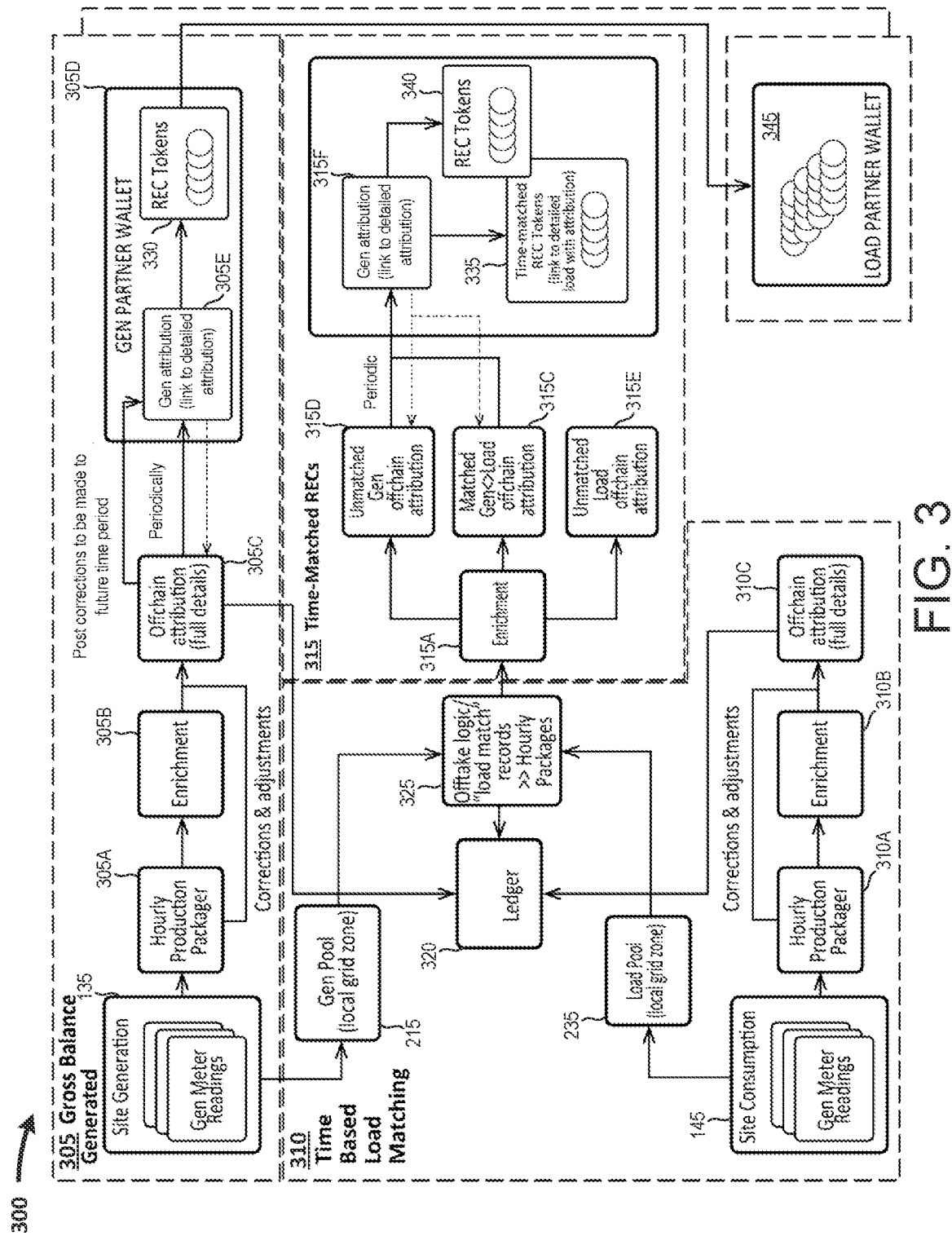
FIG. 3 depicts a block diagram of an exemplary energy tracking and processing infrastructure from which energy source profile displays such as shown in FIGS. 1 and 10-14 may be generated.

FIG. 3 depicts a block diagram of an exemplary energy tracking and processing infrastructure from which energy source profile displays such as shown in FIGS. 1 and 10-14 may be generated. In some embodiments an infrastructure 300 may generate one or more energy source profiles (e.g., as disclosed at least with reference to FIGS. 1 and 10-14), may provide data for generation of one or more energy source profiles, or some combination thereof. As depicted, the infrastructure 300 provides three 'levels' of load matching (e.g., used for energy source profile generation).

The first level of load matching is a gross balance generated 305. The gross balance generated 305 may include aggregated energy generation over a relatively large time period (e.g., by month) to generate a gross (e.g., bulk) energy source without matching consumption by time sub-increment. In the depicted embodiment, the gross balance generated 305 includes readings by generation meter 135 from generation sites. The meter readings may, for example, be transformed into EGDRs (e.g., hashed and/or recorded on a Merkle tree (e.g., trie)). The meter readings (e.g., after transformation into EGDRs) may be packaged by a production packager 305A by predetermined time increment (e.g., hourly). The time-aggregated generation records may be enriched (e.g., location data, ISO data) by an enrichment engine 305B and attributed off-chain (e.g., without recording on and/or reading from a blockchain) by an off-chain attribution engine 305C. Generation attributions are then recorded, by a generation attribution engine 305E in bulk time increments (e.g., monthly) on a blockchain (e.g., Quorum).

The generation attributions may, for example, be recorded in blocks of predetermined energy quanta (e.g., 1 MWh), such as, by way of example and not limitation, is described at least in U.S. patent application Ser. No. 62/934,113, Ser. Nos. 17/095,438, and 17/104,369, incorporated herein by reference in their entirety. Unattributed energy may, for example, be used to generate renewable energy credit (REC) tokens 330 which are recorded on the blockchain. Attribution and/or RECs may, for example, be associated through the blockchain with a digital wallet 305D of an energy generation entity, an energy consumption facility, or some combination thereof. In various embodiments of gross balance generated 305, the generation records may be traceable by location and/or individual time increment (e.g., through association to corresponding EGDRs). However, the generation records may not be matched to consumption on a granular time level (e.g., by week, day, hour, minute, second).

The second level of load matching is time-based load matching 310. Generation records and consumption records are received and associated with one or more data pools (gen pools, load pools) and associated by predetermined time increment (e.g., and transmission data). In the depicted embodiment, consumption meter readings are received from consumption sites via load pool virtual meters 235 to create load pool(s). The meter readings may, by way of example and not limitation, be transformed into energy consumption data records (ECDRs) (e.g., hashed and/or recorded on a Merkle tree (e.g., trie)). The meter readings (e.g., after transformation into ECDRs) may be packaged by predetermined time increment (e.g., hourly). The time-aggregated consumption records may be enriched (e.g., location data, ISO data) and attributed off-chain (e.g., without recording on and/or reading from a blockchain).

In the depicted example, the consumption meter readings (e.g., from consumption meter 145) may be packaged (e.g., after transformation into ECDRs) by a production packager 310A by predetermined time increment (e.g., hourly). The time-aggregated consumption records may be enriched (e.g., location data, ISO data) by an enrichment engine 310B and attributed off-chain (e.g., without recording on and/or reading from a blockchain) by an off-chain attribution engine 310C. Consumption attributions are then recorded in a ledger 320.

In the depicted example, the generation meter readings are received into a generation pool(s) (e.g., as discussed with reference to generation groups 210 in FIG. 2) via gen pool virtual meters 215. The generation pool may, by way of example not limitation, correspond to an existing local energy distribution grid zone. The consumption meter readings are received into a load pool (e.g., as discussed with reference to consumption groups 230 in FIG. 2). The load pool may, by way of example not limitation, correspond to an existing local energy distribution grid zone.

The energy generation data (e.g., as EGDRs) and energy consumption data (e.g., as ECDRs) are matched by an offtake logic engine 325 according to predetermined time increments (e.g., hourly) and predetermined permission(s) (e.g., from permissions module 178). The time increments may be relatively small compared to traditional energy and consumption balance systems (e.g., as compared to monthly reconciliation). In various embodiments the matching may occur in digital logic lakes (e.g., as described with reference to virtual meters 215 and 235 and logic lakes 220 in FIG. 2). Off-chain attribution (e.g., via contracts mediated by at least one ISO or other contract-management entity designating energy generation and/or load for specific distribution zones, consumption facilities, generation facilities, and/or customers) for generation and consumption is recorded in a ledger 320, together with the time-matched load-matching records. Accordingly, the ledger 320 is provided with a record of individual energy generation and data records with fine-grained associations at least by time and location. The ledger may, for example, provide data for generation of one or more energy source profiles.

The third level of load matching is time matched RECs 315 and/or other digital assets. Energy consumption and generation associations and at least some corresponding data (e.g., energy source profiles) is enriched. The data received may, by way of example not limitation, include EGDRs, generation profiles, ECDRs, consumption profiles, hashes representing generation and/or consumption records, or some combination thereof. The data may be enriched by an enrichment engine 315A, by way of example and not limitation, with transmission data, delivery data, scheduling data, billing data, contract data, payment data, or some combination thereof. The enriched data may include unmatched generation after off-chain attribution, matched generation and load from off-chain attribution, unmatched consumption after off-chain attribution, or some combination thereof.

The unmatched energy records after off-chain attribution (e.g., generation 315D) and the time-matched generation and consumption records 315C may, by way of example not limitation, be aggregated in time (e.g., monthly) according to predetermined time intervals (e.g., hourly, daily, weekly, monthly blocks) and recorded as generation attribution 315F in at least one blockchain. As depicted, the blockchain includes links to detailed attribution data. The detailed attribution data may include, by way of example and not limitation, individual EGDRs linking each blockchain record back to individual energy generation data records received from a generation facility, which may be enriched by data relating to transmission, scheduling, carbon footprint, (partial) consumption, or some combination thereof.

Digital assets (e.g., REC tokens 340) are created from the blockchain records. The digital assets may be generated, for example as bulk time assets (not linked to a specific time) and/or as time-matched assets 335 associated with a specific time interval (e.g., a particular hour in a particular day) which are "time-matched" to consumption (e.g., unmatched load 315E) from the same specific time interval. The time-matched REC tokens are linked back (e.g., through blockchain records and associated hashes through one or more data structures such as a Merkle trie) to associated generation (e.g., EGDRs) and consumption (e.g., ECDRs) records. Accordingly, excess generation (e.g., in the form of EGDR's) may be advantageously sold (e.g., associated with a digital wallet 345 of a consumer/load partner) to match with excess consumption on a time-matched basis. As depicted, data is retrieved from the blockchain generation attribution records to provide load matching.

The infrastructure 300 may, by way of example and not limitation, be implemented using one or more computers, remote servers, distributed computing resources, "smart" (e.g., IoT) meters, or some combination thereof. Various embodiments may, for example, implement at least some portion of one or more infrastructures and/or methods disclosed in U.S. Patent Application Ser. No. 63/143,574 (the entirety of which is incorporated herein by reference), U.S. patent application Ser. Nos. 62/934,113, Ser. Nos. 17/095,438, and/or 17/104,369, or some combination thereof, the entire contents of which applications are incorporated herein by reference.

Figure 4:
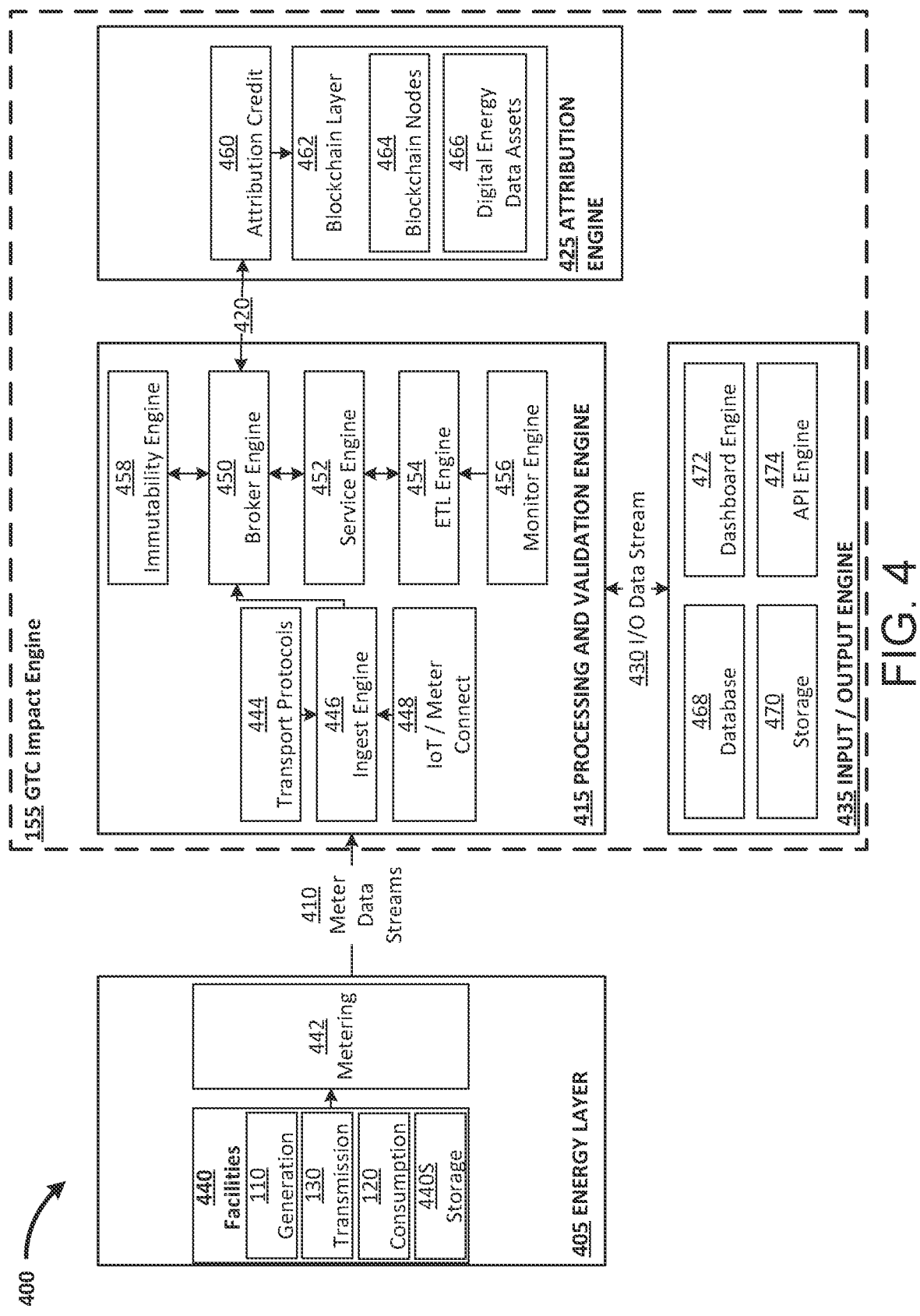
FIG. 4 depicts a block diagram of an exemplary energy tracking and processing infrastructure.

FIG. 4 depicts a block diagram of an exemplary energy tracking and processing infrastructure. The depicted sustainable energy tracking and processing infrastructure (ETPI) system 400 may, for example, provide a technological solution to maintain secure, traceable, and immutable records of renewable energy generation and energy consumption, at one or more energy facilities using a Merkle trie and blockchain-based architecture. More specifically, in energy layer 405, energy facilities 440 may include, as depicted: (1) a net energy generation facility 110 (e.g., wind/solar/wave farms, dams, geothermal power stations), (2) a net energy consumption facility 120 (e.g., office buildings, factories, warehouses), (3) a physical transmission link 130 (e.g., energy transmission facility, scheduling and delivery infrastructure, substations), (4) an energy storage facility 440S (e.g., battery bank, gravity storage, inertial storage), or some combination thereof (e.g., an office building with a roof that is covered with an array of solar panels and has a battery bank in the basement, with associated transmission and scheduling equipment). Energy flow from, through, and/or to the various facilities 440 are measured via metering devices 442. The metering devices 442 generate corresponding meter data streams 410 (e.g., generation data stream 135A and consumption data streams 145A, such as is disclosed at least with reference to FIG. 1).

Data streams are received by processing and validation engine 415. Processing and validation engine 415 receives meter data streams 410 via transport protocols 444 or internet of things (IoT)/meter connectors 448. The received data is processed by ingest engine 446. Ingest engine 446 provides data to a broker engine 450. Broker engine 450 exchanges data with immutability engine 458 (e.g., a Merkle engine such as is disclosed at least with reference to FIGS. 1-3D of U.S. application Ser. No. 17/095,438, titled "Sustainable Energy Tracking System Utilizing Blockchain Technology and Merkle Tree Hashing Structure," filed by Eric Miller, et al., on Nov. 11, 2020, the entirety of which disclosure is incorporated herein by reference) and service engine 452 to perform various processing, recording, and validation functions. The service engine 452 interacts with extract-transform-load (ETL) engine 454 to retrieve data from datastores through monitor engine 456. Accordingly, various embodiments may, for example, advantageously track, process, and validate physical energy generation, transmission, and consumption data.

Attribution data 420 is sent from broker engine 450 to attribution engine 425, which generates attribution credit 460. Attribution credit 460 is stored in blockchain layer 462. Blockchain layer 462 includes one or more blockchain structures having blockchain nodes 464. Digital energy assets 466 (which may be implemented in various embodiments as smart contracts) are generated (e.g., digital energy assets 175) such as, by way of example and not limitation, renewable energy data, digital renewable energy credits, digital CO2e assets and liabilities, digital CO2e allowances, and digital energy efficiency credits. Accordingly, various embodiments may, for example, advantageously generate secure, immutable, verifiable digital energy data assets such as, by way of example and not limitation, blockchain tokens.

Such tokens may, for example, advantageously provide negotiable instruments representing, by way of example and not limitation, physical energy quanta, carbon intensity, environmental impact, energy efficiency, other appropriate energy-related attributes, or some combination thereof. For example, digital asset tokens may be used to advantageously securely track and attribute sustainable energy generation and usage, for the beneficial purpose of powering and supporting various green energy-focused technological systems and processes (often referred to as "Green-Tech").

Processing and validation engine 415 communicates with input-output (I/O) engine 435 via input-output data stream 430 (I/O data stream). I/O engine 435 includes database(s) 468, storage object(s) 470, dashboard engine 472, and API engine 474. Accordingly, various embodiments may, by way of example and not limitation, advantageously facilitate users viewing, negotiating, and verifying production, transmission, and consumption of energy quanta and digital energy data assets generated therefrom.

Figure 5:
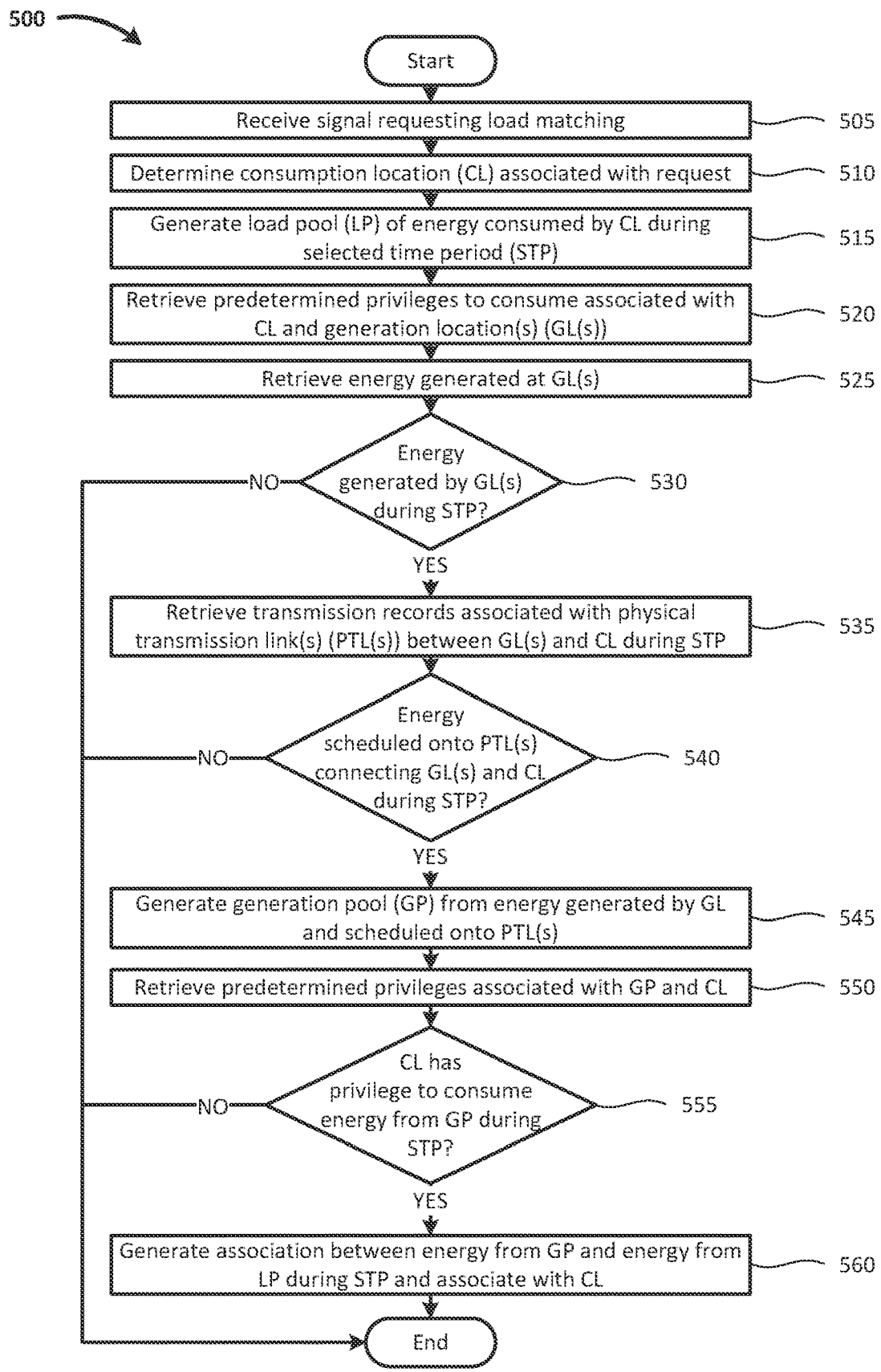
FIG. 5 depicts an exemplary method of load matching energy generation, transmission, and consumption based on physical availability of generated energy at a consumption location during a selected time interval.

FIG. 5 depicts an exemplary method of load matching energy generation, transmission, and consumption based on physical availability of generated energy at a consumption location during a selected time interval. In a method 500, a signal is received, in a step 505, requesting load matching. A consumption location (e.g., energy consumption facilities 120) associated with the request is determined in a step 510. A load pool of energy (e.g., load pool virtual meters 235) consumed by the consumption location during a selected time period associated with the request is generated in a step 515 (e.g., corresponding to the consumption data streams 145A). In a step 520, predetermined privileges to consume energy associated with the load pool (e.g., via the consumption location) are retrieved and generation location(s) (e.g., generation facility 110) associated with the consumption location are retrieved. Record(s) of energy generated (e.g., corresponding to the generation data stream 135A) at the generation location(s) is retrieved in a step 525.

If it is determined, in a decision point 530, that the retrieved energy generated by the generation location(s) was generated during the selected time period, then the method 500 proceeds to a step 535. Otherwise, the method 500 ends. In the step 535, transmission records (e.g., corresponding to transmission data stream 140A) associated with one or more physical transmission links between the generation location(s) and the consumption location during the selected time period are retrieved.

If it is determined, in a decision point 540, that, during the selected time period, energy was scheduled from the generation location(s) onto the physical transmission link(s) connecting the generation location(s) and the consumption location, then the method 500 proceeds to a step 545. Otherwise, the method 500 ends. In the step 545, a gen pool (e.g., virtual meters 215) is generated associating measured energy generated by the generation location(s) and scheduled onto the physical transmission link(s) from the generation location(s) to be available at the consumption location during the selected time period. Predetermined privileges associated, at the selected time period, with the gen pool (e.g., by the generation location(s) and/or the physical transmission link(s)) and with the consumption location are retrieved in a step 550.

If it is determined, in a decision point 555, that the consumption location had the privilege to consume energy from the gen pool during the selected time period, then one or more association(s) are generated, in a step 560, between the data structures (e.g., EGDRs) associated with the energy generated represented in the gen pool for the selected time period and with the data structures (e.g., ECDRs) associated with the energy consumed represented in the load pool for the selected time period, and the method 500 ends. Accordingly, various embodiments may advantageously automatically generate data structures associating energy physically generated and transmitted to a consumption location during a specific time period with energy consumed during that time period by the consumption location, based on (historical) generation, transmission, and consumption records and predetermined privileges.

Figure 6:
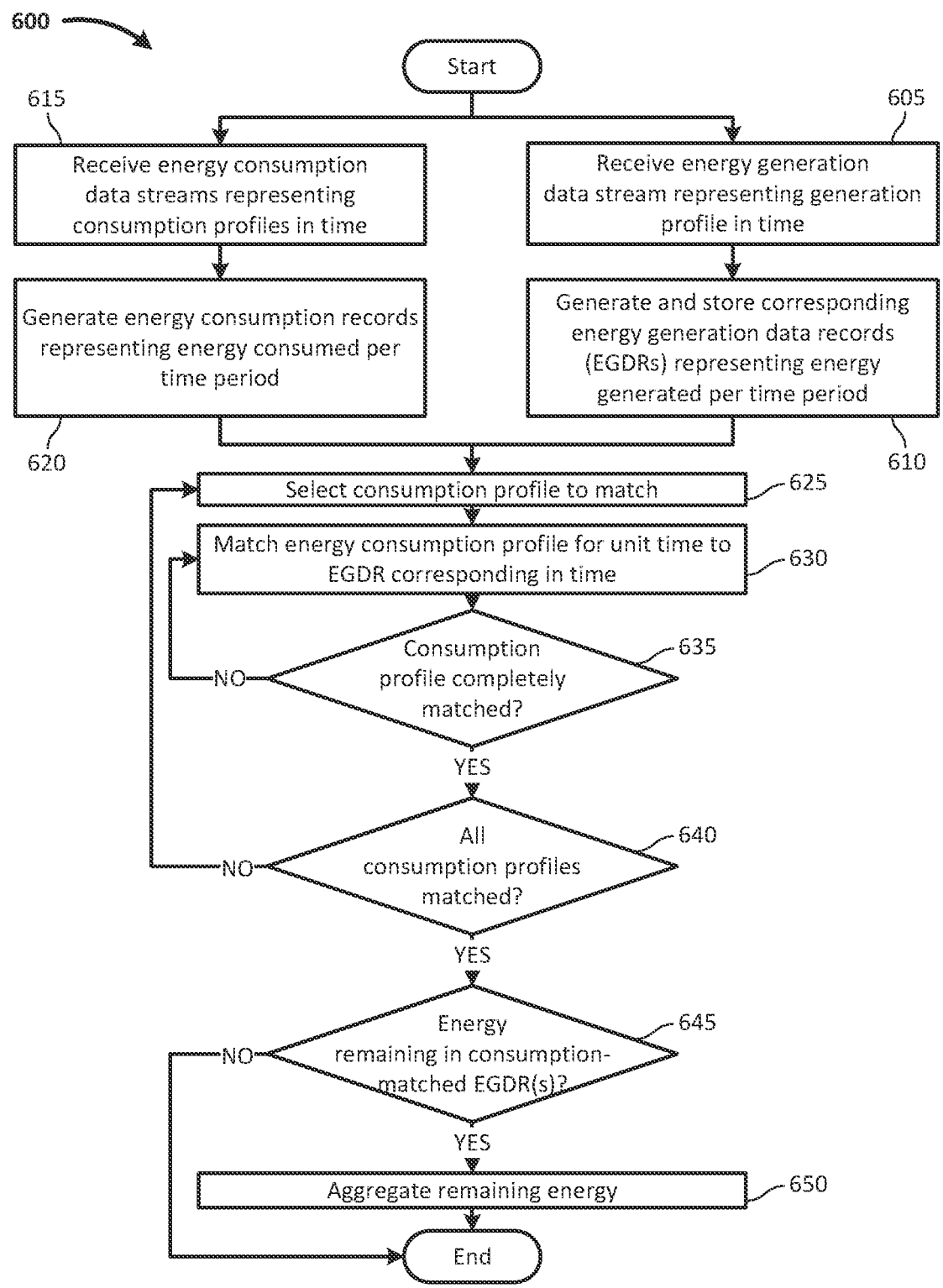
FIG. 6 depicts an exemplary method of selective energy generation and consumption profile matching and energy aggregation.

FIG. 6 depicts an exemplary method of selective energy generation and consumption profile matching and energy aggregation. In a depicted method 600, energy tracking and processing infrastructure (e.g., ETPI) receives, in a step 605 one or more energy generation data streams (e.g., 145A) representing profiles (e.g., generation profile 160) of energy quanta generated in time (e.g., from energy generation facilities 110). The energy generation data stream is processed in a step 610 (e.g., by processing and validation engine 415) to generate and store corresponding energy generation data records (EGDRs, e.g., EGDR 165) representing energy generated per unit time. The ETPI also receives, in a step 615, energy consumption data streams (e.g., 145B) representing profiles (e.g., consumption profile 170A, consumption profile 170B) of energy quanta consumed in time (e.g., from energy consumption facilities 120). The energy consumption data streams are processed in a step 620 (e.g., by processing and validation engine 415) to generate corresponding records representing energy consumed per unit time.

At least one consumption profile is then selected in a step 625 to perform matching operations on. Energy quanta per unit time from the selected consumption profile is matched in a step 630 to an EGDR corresponding in time. If the consumption profile is determined, in a decision point 635, to not be completely matched, then the matching operation in the step 630 continues with one or more additional EGDRs corresponding in time (e.g., from other energy generation facilities) until the consumption profile is determined, in the decision point 635, to be completely matched. Once the consumption profile is determined to be completely matched, if it is determined in a decision point 640 that all consumption profiles are not yet matched, then another consumption profile is selected in the step 625 and step 630 through decision point 640 are repeated, as necessary.

Once all consumption profiles are determined, in the decision point 640, to be matched, if unmatched energy remains in one or more EGDRs used to satisfy the energy consumption profiles matched, then the unattributed energy is aggregated in a step 650 (e.g., into blocks representing predetermined quanta of energy). If it is determined, in a decision point 645, that no energy is remaining, then the method 600 ends. Various embodiments may advantageously allow dynamic and selective one-to-many, many-to-one, one-to-one, and/or many-to-many matching of EGDRs and consumption data records corresponding in time. Accordingly, energy consumption may be immutably, securely, and verifiably matched, for example, across dynamic combinations of generation facilities, consumption facilities, or some combination thereof. Existing metering infrastructure with predetermined time reporting increments may, for example, advantageously be used to generate immutable, verifiable, and secure records while also, for example, advantageously enabling exact matching of generation and consumption data.

Figure 7:
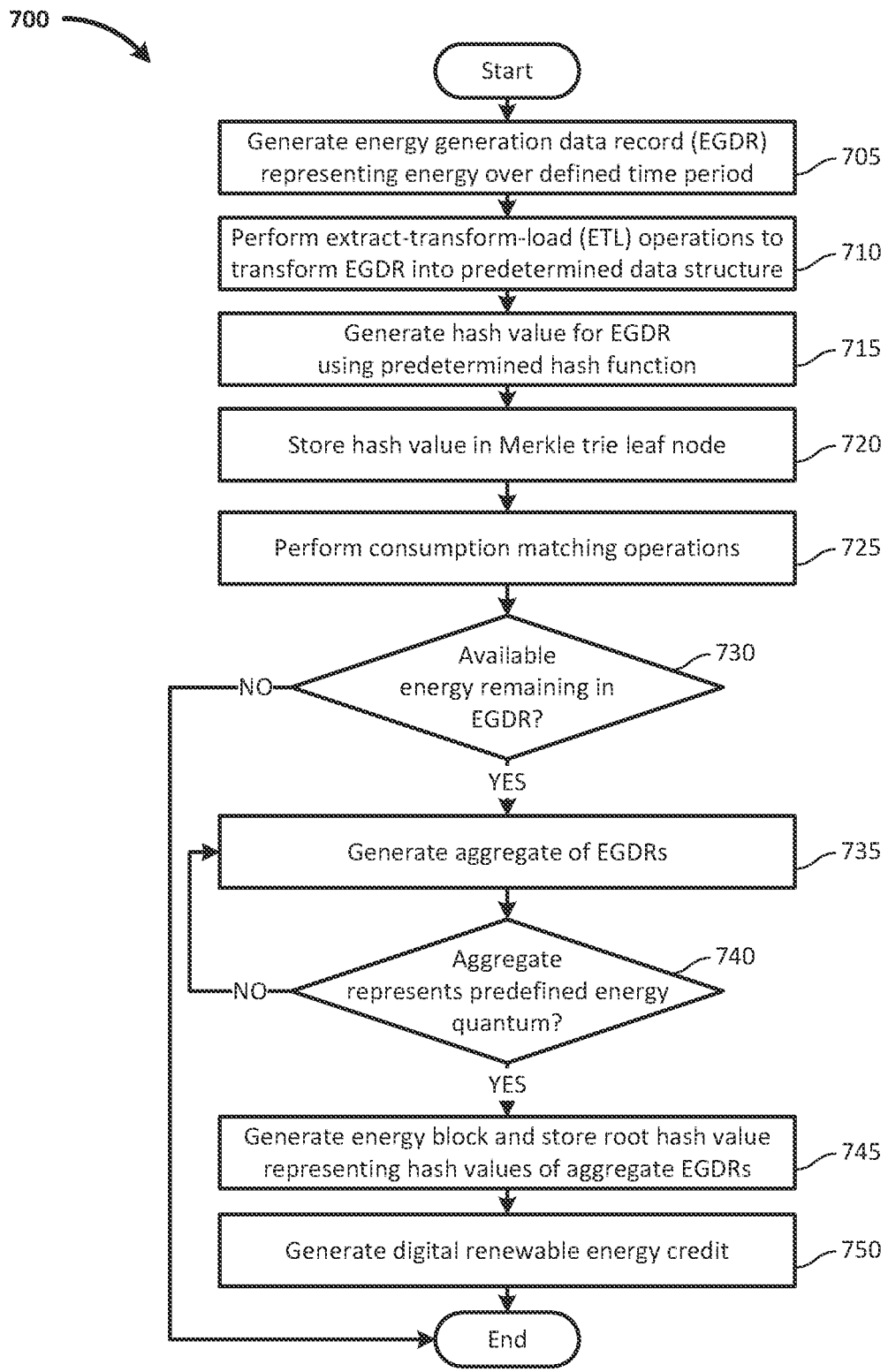
FIG. 7 depicts an exemplary method of selective energy digital renewable energy credit generation.

FIG. 7 depicts an exemplary method of selective energy digital renewable energy credit generation. In the depicted method 700, an energy generation data record (EGDR, e.g., EGDR 165) representing energy generated over a defined time period is generated in a step 705. Extract-transform-load (ETL) operations are performed in step 710 (e.g., by processing and validation engine 415, including ETL engine 454) to transform the EGDR into a predetermined data structure. A hash value is generated in a step 715 for the EGDR using a predetermined hash function (e.g., by processing and validation engine 415). The hash value is then stored (in a step 720) in a leaf node of a Merkle trie (e.g., by immutability engine 458). Consumption matching operations are then performed in a step 725 such as, by way of example and not limitation, the dynamic and selective energy and consumption profile matching operations described in relation to FIG. 6.

When consumption matching operations are performed in the step 725, if available energy is determined, in a decision point 730, to not be remaining in the EGDR, then the method 700 ends. If available energy is determined, in the decision point 730, to be remaining, then an aggregate of EGDRs containing available energy is generated in a step 735 (e.g., by processing and validation engine 415), the aggregate including only the available energy in each EGDR. If the aggregate of EGDRs is determined, in a decision point 740, to represent a predefined energy quantum (e.g., megawatt-hour (MWh), kilowatt-hour (kWh), Joule, other appropriate energy quantum, or multiple thereof), then an energy block is generated in a step 745 and a root hash value is stored in a blockchain representing hash values of the aggregated EGDRs. A digital renewable energy credit (REC, e.g., digital energy assets 175) is generated in a step 750 corresponding to one or more energy blocks. by way of example and not limitation, the digital REC may correspond to sustainable energy generated and not consumed by target consumption facilities during at least one time period. Accordingly, various embodiments may advantageously allow a consuming entity to generate fungible digital energy assets as a function of dynamic and selective consumption and generation matching. For example, various embodiments may advantageously allow exact matching of consumption and generation such that unconsumed fragments of EGDRs which may otherwise have been unrecognized and practically lost, are recognized and aggregated into fungible digital energy assets.

In various embodiments, energy blocks may, by way of example and not limitation, be generated by the processing and validation engine 415. A root hash value of an energy block may be at least partially generated, for example, by the Immutability engine 458. The energy block may, for example, correspond to a block in a blockchain (e.g., blockchain layer 462). The root hash value may, for example, be stored as a blockchain node (e.g., blockchain nodes 464) in the blockchain.

Figure 8:
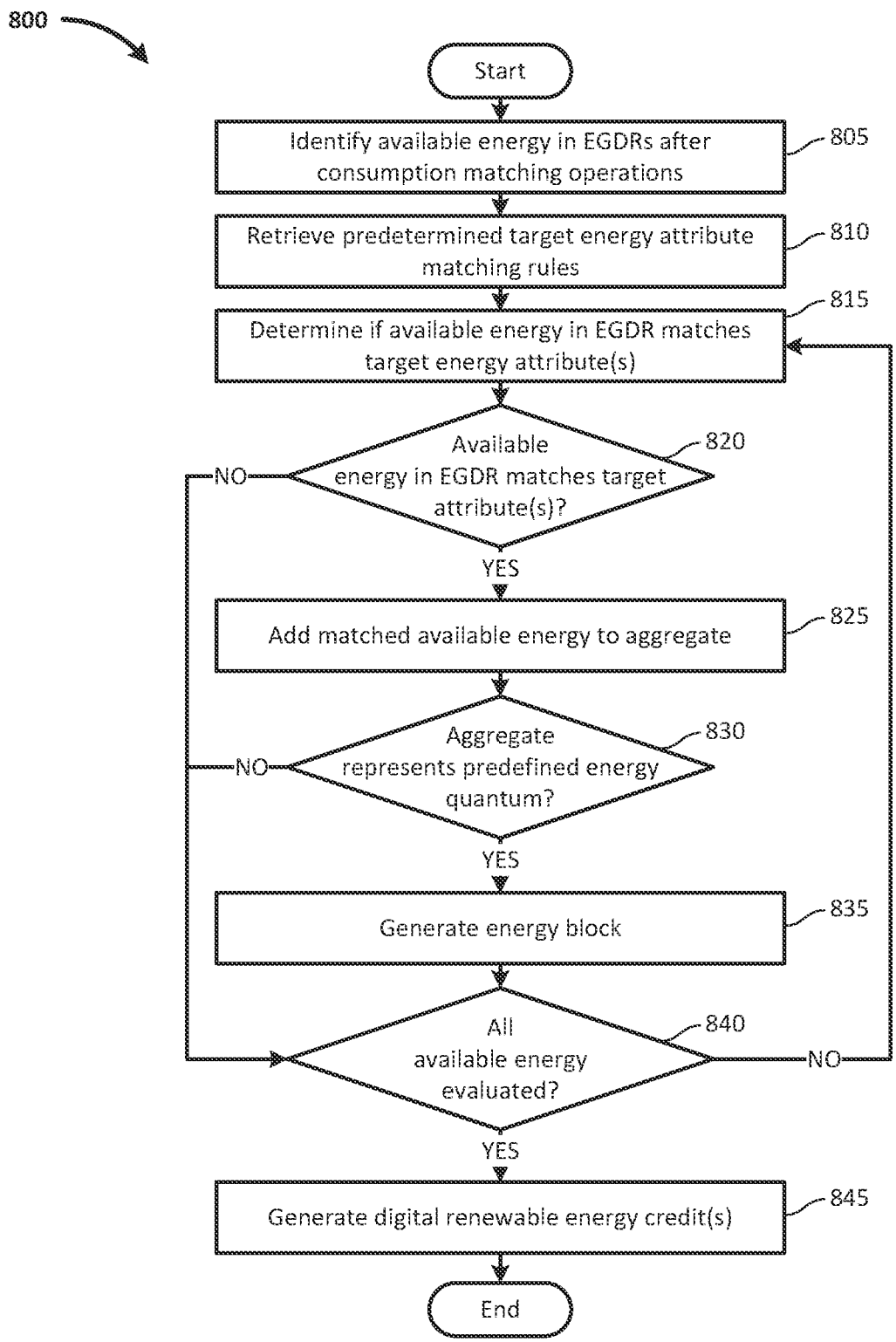
FIG. 8 depicts an exemplary method of selective aggregation of target energy attributes.

FIG. 8 depicts an exemplary method of selective aggregation of target energy attributes. In the depicted method 800, available energy in EGDRs (e.g., EGDR 165) is identified in a step 805 after consumption matching operations (e.g., as described in relation to FIG. 3) are completed. Predetermined target energy attribute matching rules are retrieved in a step 810. Target energy attributes may include, by way of example and not limitation, time period(s) (e.g., corresponding to on-peak and/or off-peak energy generation and/or consumption time periods), sustainable energy (e.g., is/is-not sustainably generated), energy generation method (e.g., solar, natural gas, wind, nuclear, coal), energy generation location, transmission information (e.g., transmitted through one or more predetermined transmission infrastructures), custom attributes, or some combination thereof. Predetermined matching rules may, by way of example and not limitation, be determined by a standards body, a governmental authority, a digital energy asset marketplace, digital energy asset purchaser, a digital energy asset seller, or some combination thereof.

The dealers are evaluated to determine, in a step 815, if available energy therein matches target energy attributes defined by the predetermined matching rules. If the available energy is determined, in a decision point 820, to not match the target attributes, the method proceeds to a decision point 840. If the available energy is determined, in the decision point 820, to match the target attributes, then the available energy matched is added to an aggregate in a step 825 (e.g., according to aggregation operations described in relation to FIG. 4). If the aggregate is determined, in a decision point 830, to not represent a predefined energy quantum, then the method proceeds to the decision point 840. If the aggregate is determined, in the decision point 830, to represent a predefined energy quantum, an energy block is generated in a step 835 (e.g., as described in relation to FIG. 7).

At the decision point 840, if all available energy has not been evaluated, then the method returns to the step 815 to repeat step 815 through the decision point 840 on other EGDRs containing available energy. If all available energy is determined, in the decision point 840, to have been evaluated, then at least one digital renewable energy credit is generated in a step 845 (e.g., as described in relation to FIG. 7, by processing and validation engine 415 and/or attribution engine 425, or some combination thereof) corresponding to the energy block(s) generated in the step 835 and corresponding to energy identified in the step 805 as available. Accordingly, various embodiments may advantageously permit digital RECs to be generated from excess energy available after consumption and generation profile matching is performed. For example, various embodiments may advantageously permit "fragments" of energy quanta generated in a unit time and partially consumed in that time period to be recognized and aggregated into predetermined energy quanta and securely, verifiably, and immutably stored in a blockchain and negotiated as a fungible asset.

Figure 9:
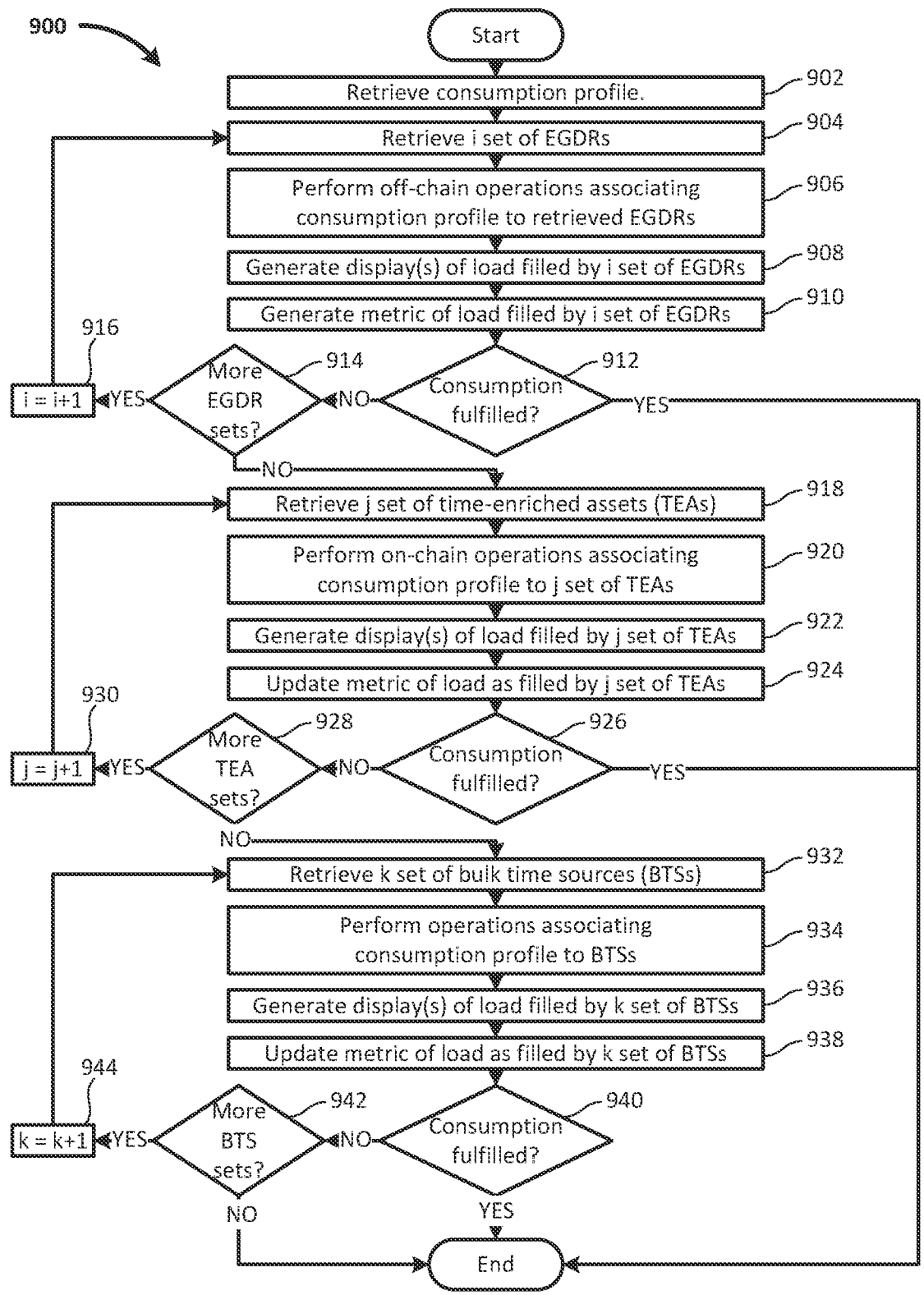
FIG. 9 depicts an exemplary method of generating a time-matched energy source profile display.

FIG. 9 depicts an exemplary method of generating a time-matched energy source profile display. The method 900 begins by retrieving a consumption profile in a step 902 and an "ith" set of energy generation records (e.g., EGDRs) in a step 904. The variable "i" may correspond, for example, to a group and/or subgroup of energy generation records. In an illustrative example, i, by way of example and not limitation, may range from i=1 to i=N (in integers) where N=3, corresponding to one of three types of time- and location-matched energy sources (e.g., time-matched on-site generation, time-matched contracted generation, time-matched digital energy assets) such as discussed at least with reference to FIG. 10. In various embodiments the energy generation records may be retrieved according to one or more prioritization rules (e.g., apply on-site generation first) retrieved from one or more data stores and applied by one or more processors.

Once the consumption profile and generation records are retrieved (step 902 and step 904), off-chain operations are performed in a step 906 associating the consumption profile with the retrieved energy generation records (e.g., as discussed with reference to FIG. 2 and FIG. 3). Once the consumption profile is associated with the retrieved EGDRs one or more visual indicia of the resulting energy source profile is generated in a step 908 corresponding to the ith set of EGDRs. Further, a metric of the energy source profile, as determined according to at least one set of prioritizations and/or scaling rules, is generated in a step 910. If the consumption is determined, in a decision point 912, to be fulfilled, then the method ends. Otherwise, if more EGDR sets are determined, in a decision point 914, to be available, then i is incremented in a step 916 and the next set of EGDRs is retrieved in a step 904 in a repeating process until the consumption is determined, in the decision point 912, to be fulfilled or all available EGDR sets (e.g., i=N) are fully matched to the consumption profile.

If the consumption is determined, in the decision point 912, to not be fulfilled, and it is determined in the decision point 914 that no more EGDR sets are available, then a "jth" set of time enriched assets (TEAs) are retrieved in a step 918. The TEAs may be digital assets recorded, by way of example and not limitation, on one or more blockchains. The variable "j" may correspond, for example, to a group and/or subgroup of energy generation records. In an illustrative example, j, by way of example and not limitation, may range from j=1 to j=M (in integers) where M=1, corresponding to one type of time-enriched digital assets (e.g., hourly matched digital RECs) such as discussed at least with reference to FIG. 10. In various embodiments the energy generation records may be retrieved according to one or more prioritization rules retrieved from one or more data stores and applied by one or more processors.

On-chain operations are performed in a step 920 associating the consumption profiles with the retrieved TEAs. Once the consumption profile is associated with the retrieved TEAs one or more visual indicia of the resulting energy source profile is generated in a step 922 corresponding to the jth set of TEAs. Further, a metric of the energy source profile, as determined according to at least one set of prioritizations and/or scaling rules, is updated in a step 924. If the consumption is determined, in a decision point 926, to be fulfilled, then the method ends. Otherwise, if more TEA sets are determined, in a decision point 928, to be available, then j is incremented in a step 930 and the next set of TEAs is retrieved in the step 918 in a repeating process until the consumption is determined, in the decision point 926, to be fulfilled or all available TEA sets (e.g., j=M) are fully matched to the consumption profile.

If the consumption is determined, in the decision point 926, to not be fulfilled and it is determined in the decision point 928 that no more TEA sets are available, then a "kth" set of bulk time sources (BTSs) are retrieved in a step 932. The BTSs may be energy received, by way of example and not limitation, via traditional contracts and/or distribution grids (e.g., intra-month contracts, inter-month contracts, energy without granular time data sufficient for a predetermined time-matching increment). The variable "k" may correspond, for example, to a group and/or subgroup of energy generation records (e.g., obtained directly from ISO settlement data). In an illustrative example, k, by way of example and not limitation, may range from k=1 to k=P (in integers) where P=2, corresponding to one of two types of bulk time energy sources (e.g., bulk time contracted energy, bulk time certificates) such as discussed at least with reference to FIG. 10. In various embodiments the energy generation records may be retrieved according to one or more prioritization rules retrieved from one or more data stores and applied by one or more processors.

Operations are performed in a step 934 associating the consumption profiles with the retrieved BTSs. Once the consumption profile is associated in the step 934 with the retrieved BTSs, then one or more visual indicia of the resulting energy source profile is generated in a step 936 corresponding to the kth set of BTSs. Further, a metric of the energy source profile, as determined according to at least one set of prioritizations and/or scaling rules, is updated in a step 938. If the consumption is determined, in a decision point 940, to be fulfilled, then the method ends. Otherwise, if it is determined in a decision point 942 that more BTS sets are available, then k is incremented in a step 944 and the next set of BTSs is retrieved in the step 932 in a repeating process until the consumption is determined, in the decision point 940, to be fulfilled or all available BTS sets (e.g., k=P) are fully matched to the consumption profile.

Figure 10:
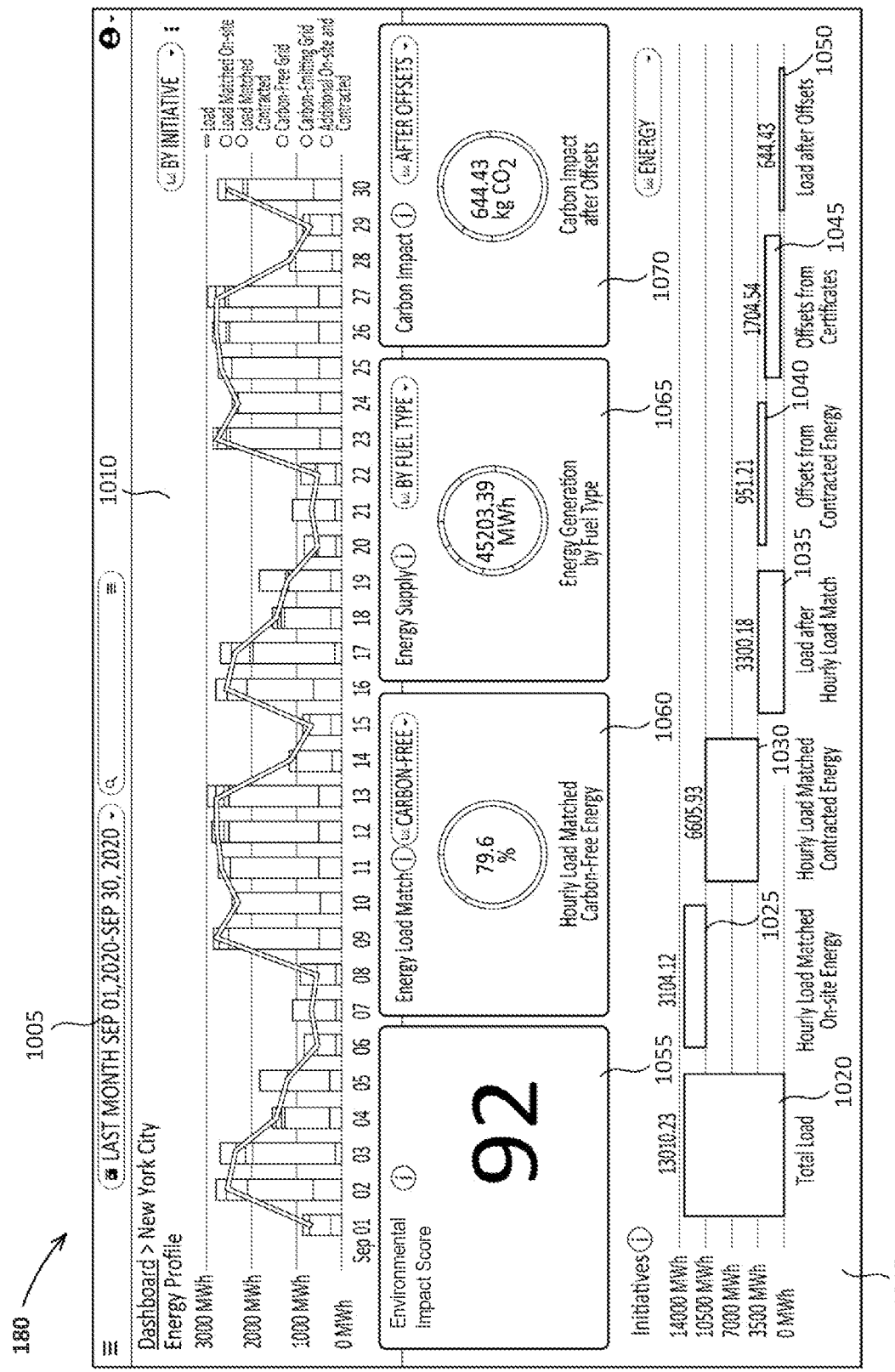
FIG. 10 depicts an exemplary energy source profile display employed in an illustrative use-case scenario and displaying time- and location-aggregated energy generation and consumption.

FIG. 10 depicts an exemplary energy source profile display employed in an illustrative use-case scenario and displaying time- and location-aggregated energy generation and consumption. The visual indicia 180 may, for example, correspond to a portfolio of consumption facilities (e.g., 135) associated with (e.g., owned, leased, operated) Stark Industries. The visual indicia 180 includes a time range display 1005 (e.g., selection interface). As depicted, the visual indicia 180 currently displays data relating to a one-month time period. An energy source profile display 1010 for the facility portfolio is displayed in one day increments based on association of geography-aggregated consumption profiles (e.g., 140) for multiple buildings with energy generation profile(s) (e.g., generation profile 160) and additional energy generation data. The consumption profiles 170 and the generation profiles 160 may, by way of example and not limitation, be obtained from an infrastructure such as is discussed with reference to infrastructure 200. Association of the profiles may, by way of example and not limitation, at least partially occur in load matching logic lakes 220.

As depicted, the load for the facility portfolio is displayed each day as matched against time-matched on-site generation (apricot color), time-matched contracted (renewable) energy (aqua color), bulk time (e.g., matched only by month) carbon-free sources (green color), bulk time carbon-emitting sources (gray color), and additional (e.g., surplus, unutilized energy) generated on-site and/or externally generated and available by contract (lime color). The display may be generated, for example, after matching the energy on a per-time, per-location basis according to predetermined rules of priority.

Energy sources may be divided, for example, into two priority groups: time-matched (e.g., second, minute, hour, day) and bulk-time (e.g., only associated by week, month, quarter). Within each priority group, individual sub-groups of energy sources may be applied according to predetermined rules of priority. For example, on-site (renewable) generation (e.g., for a particular facility, within a portfolio) may be applied first (e.g., as depicted by the apricot color segments). Time matched (renewable, e.g., carbon free) contracted energy may be applied, for example, after on-site generation and before bulk time sources. Within bulk time sources, renewable (e.g., carbon free) sources may be applied before non-renewable sources. Accordingly, a user (e.g., facility portfolio manager, energy trader) may assess at a glance the impact of various sources. The user may, for example, thus be able to immediately identify problems, opportunities, or some combination thereof.

In the depicted embodiment, the visual indicia 180 further includes a time- and location-aggregated display 1015 corresponding to an aggregate of all consumption profiles, for the facility portfolio across the period of time shown in the time display 1005, to aggregated generation profiles aggregated for the facility portfolio across the period of time. An entire load 1020 for the portfolio is shown on the left on a vertical MWh scale. In the depicted embodiment, the load 1020 is first satisfied by hourly load matched on-site energy 1025. Although shown in the display 1015 as an aggregated 'total impact' display, in various embodiments the load is satisfied on a per time and per building basis by applying predetermined rules of priority, such as discussed previously (e.g., with reference to display 1010). The load 1020 is further satisfied by hourly load matched contracted energy 1030. The display 1015 indicates the load 1020 as a vertical bar with portions satisfied by the hourly load matched on site energy 1025 in the hourly load matched contracted energy 1030.

In the depicted embodiment, the display 1015 provides visual indicia of a portion of the load not matched with hourly energy 1035. Visual indicia of load satisfied by (bulk time) contracted energy 1040 and (bulk time) (renewable energy) certificates 1045 are provided and arranged such that the user may visually identify what portion of the unmatched load (hourly energy 1035) is satisfied with bulk time contracted energy 1040 and bulk time certificates 1045. Visual indicia of remaining unsatisfied load 1050 is displayed on the right. Accordingly, an energy source profile display 1015 corresponding to a portfolio of consumption facilities is generated and displayed. A user may, for example, advantageously immediately identify and compare impact of time-matched sources (e.g., 1025-1030) to bulk time sources (e.g., 1040-1045), identify supply shortfall from preferred sources and/or groups of sources (e.g., 1035), identify total supply shortfall (e.g., 1050), or some combination thereof. Accordingly, user may advantageously immediately assess impact of energy (e.g., sourcing) decisions, identify target areas of improvement, or some combination thereof.

In various embodiments various sources may be used to satisfy load 1020. For example, in some embodiments time-matched (renewable) energy credits (e.g., as discussed with reference to digital energy assets 175 of FIG. 1) may be applied to satisfy load. The time-matched credits may, by way of example and not limitation, be applied after time-matched contracted energy and/or before bulk time sources. In various embodiments rules of energy source profile generation (e.g., time- and location-based consumption-generation profile matching priority) and/or display may be defined, by way of example and not limitation, by a central authority, consumption entity, generation entity, governmental entity, standards organization, third-party, or some combination thereof.

In the depicted embodiment, a visual indicium of a single time- and location-aggregated energy source profile metric 1055 is displayed. The metric may, for example, be generated as a function of percentages of various energy sources (e.g., 1025-1030, 1040-1045) used to satisfy the load 1020. The function may, for example, apply one or more predetermined sets of rules (e.g., predetermined scaling factors) to various sources and/or groups (e.g., types) of sources. For example, in some embodiments the metric 1055 may be generated as a function in which a scaling factor of 1 is applied to a percentage of the load 1020 satisfied by time-matched (renewable) energy sources (e.g., on-site energy 1025 and contracted energy 1030), and a second scaling factor less than one is applied to a percentage of the load 1020 satisfied by bulk time energy sources (e.g., contracted energy 1040 and certificates 1045). A third scaling factor (e.g., less than the first two scaling factors) may, for example, be applied to non-renewable and/or partially renewable energy sources (e.g., net carbon emitting generation sources).

In various embodiments predetermined sets of rules for generating the metric 1055 may be determined, by way of example and not limitation, by a central authority, consumption entity, generating entity, governmental entity, standards organization, third-party, or some combination thereof. In various embodiments multiple metrics (e.g., applying different sets of predetermined rules) may be displayed. Accordingly, a user may advantageously identify from a single visual indicia progress towards an energy source profile goal for an (arbitrary) time period and/or consumption facility portfolio.

In the depicted embodiment, a visual indicium displaying a portion of the energy load 1020 matched by carbon free energy sources 1060 is displayed. Visual indicia displaying sources of energy generation by fuel type (e.g., coal, nuclear, wind, solar, hydro) 1065 is displayed. Visual indicia displaying carbon impact 1070 (e.g., by energy source) is displayed. In various embodiments, visual indicia (e.g., 1010, 1015, 1055-1070), or some combination thereof, may be selected by a user and/or display provider to indicate metrics of interest generated from energy consumption and/or generation profiles (e.g., at least partially by infrastructure 200).

Figure 11:
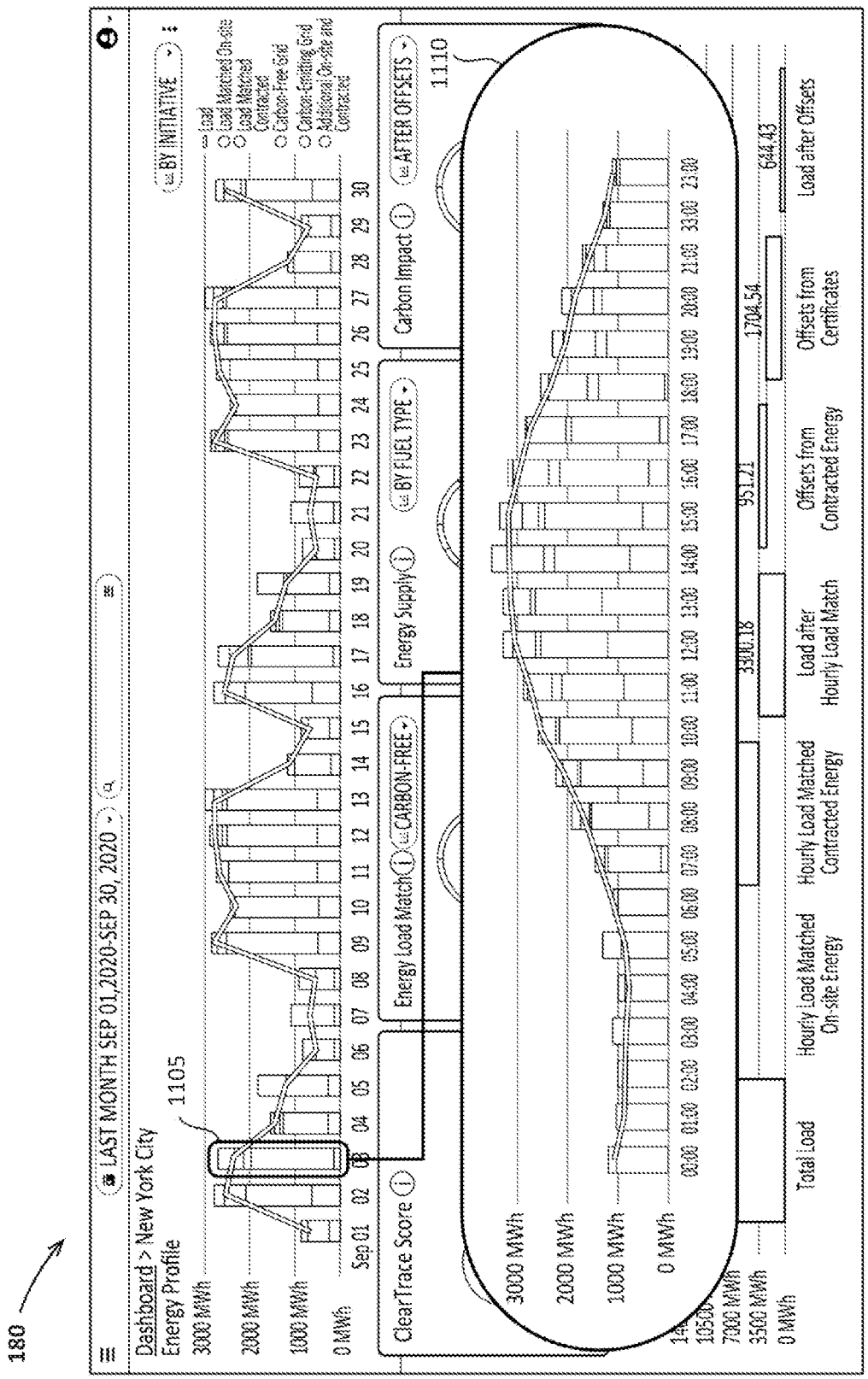
FIG. 11 depicts the exemplary time-matched energy source profile display of FIG. 10 with an overlay display of location-aggregated energy generation and consumption matching for a selected predetermined time interval.

FIG. 11 depicts the exemplary time-matched energy source profile display of FIG. 3 with an overlay display of location-aggregated energy generation and consumption matching for a selected predetermined time interval. In the depicted example the visual indicia 180 includes a location aggregated energy source profile overlay display 1110. The display 1110 corresponds to a specific time interval (e.g., day) such as shown in the time display 1005 from the location aggregated display 1010 discussed with reference to FIG. 10. As depicted, the overlay display 1110 displays an hourly energy source profile for the portfolio of consumption facilities for the selected day 1105. The energy source profile provides visual indicia (e.g., vertical bars) of location-aggregated load matching per unit time, as discussed with reference to display 1010 of FIG. 10.

Figure 12:
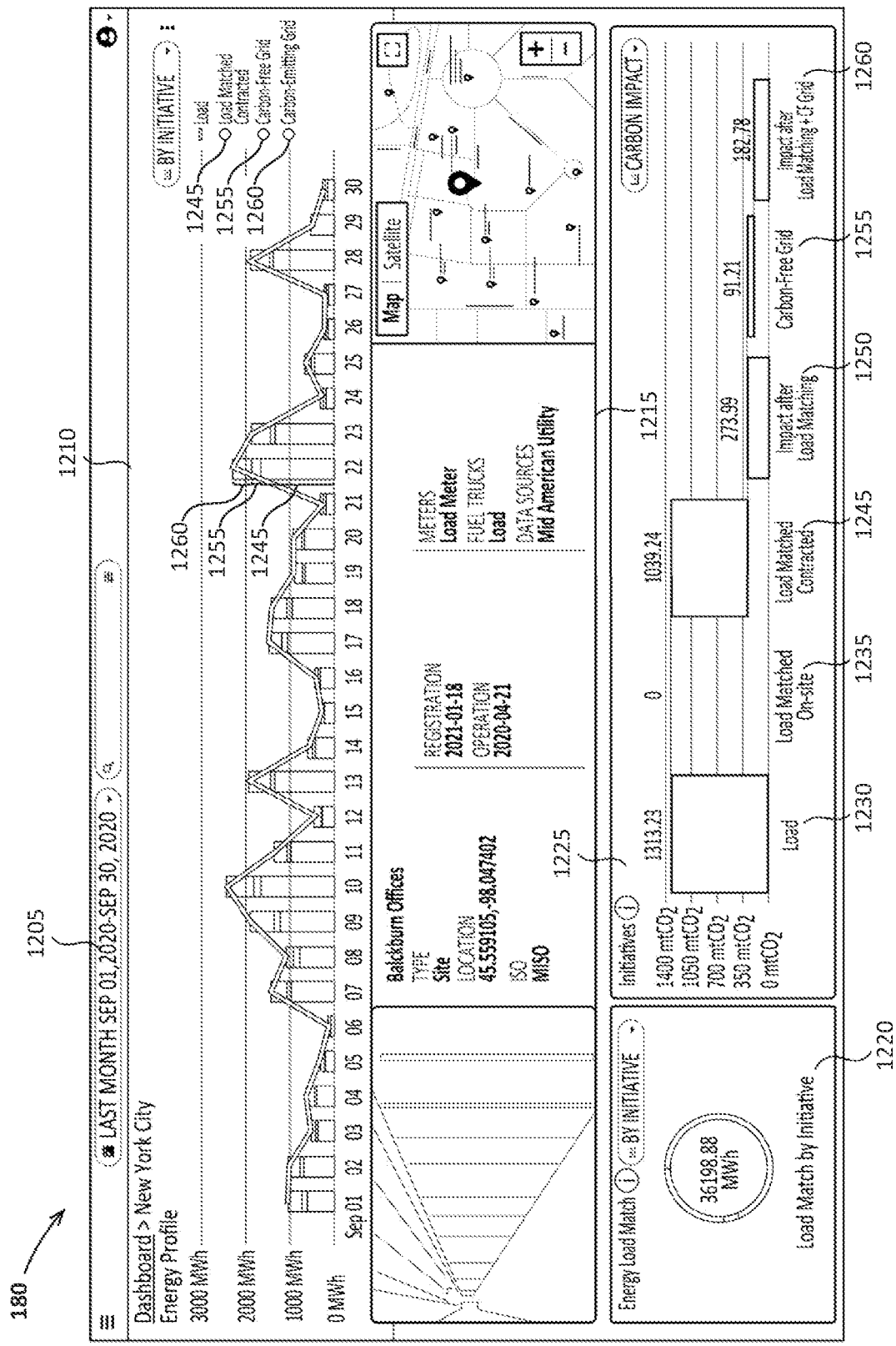
FIG. 12 depicts an exemplary time-matched energy source profile display employed in an illustrative use-case scenario and displaying time-aggregated energy generation and consumption for a particular location.

FIG. 12 depicts an exemplary time-matched energy source profile display employed in an illustrative use-case scenario and displaying time-aggregated energy generation and consumption for a particular location. The visual indicia 180 includes a time range (selector and) display 1205 such as, for example, discussed with reference to time range display 1005 of FIG. 10. Visual indicia of a location specific, partially time aggregated energy source profile 1210 are provided. As depicted, the energy source profile 1210 is aggregated by day for the time range in display 1205. The energy source profile provides visual indicia (e.g., vertical bars) of location specific load matching per aggregate time unit (e.g., day), as discussed with reference to display 1010 of FIG. 10. As depicted, a daily energy load for the specific location is matched first by time-matched energy generated on-site (e.g., 1235), then time-matched contracted (renewable and/or carbon-free) energy (e.g., 1245), then by carbon free bulk time energy source(s) (e.g., 1255), and then by carbon emitting bulk time energy source(s) (e.g., 1260). The depicted location may, for example, not have on site generation capabilities. In various embodiments various energy sources (e.g., digital RECs, time-matched RECs, on-site generation) may be used to satisfy energy load and/or included in the visual indicia. Accordingly, a user may advantageously immediately visually analyze contribution and/or utilization of energy sources by a specific location per an (aggregated) unit of time. The unit of time may, for example, be user selected.

The visual indicia 180 further includes a display 1215 of visual indicia providing reference information on the particular location (e.g., representative picture, location, type, applicable ISO, registration date, operation start date, type of meter(s) present, fuel type(s), source(s) of energy data, map display of the location). The visual indicia 180 further includes visual indicia depicting energy load match 1220 by initiative (e.g., group and/or subgroup of energy). In the depicted example, the load match by initiative corresponds to a percentage of load aggregated over the time period shown in display 1205. As depicted, the initiatives correspond to the sources of energy discussed with reference to energy source profile 1210. In various embodiments (e.g., as depicted in FIGS. 10-14) various visual indicia may be provided. Such indicia may, for example, correspond to carbon impact, energy generation by fuel type, (time-matched) carbon-free energy, or some combination thereof.

The visual indicia 180 further includes a display of a further time-aggregated energy source profile 1225 for the location. As depicted, the energy source profile 1225 is aggregated for this specific location across the entire time period shown in display 1205. The facility's load 1230 during that time period is displayed on a left side. Time-matched on-site generation 1235 is depicted. In the depicted example, no on-site generation was produced, accordingly, the visual indicium represents zero contribution from on-site generation. Time-matched contracted (renewable) energy 1245 is displayed (e.g., corresponding to being matched in priority below on-site generated). A remainder of unsatisfied load 1250 after time-matched energy sources are applied is displayed. A visual indicia of bulk time carbon-free energy sources 1255 is depicted, followed by remaining unsatisfied load 1260.

The energy source profile 1225 may, for example, correspond to a carbon impact energy source profile. Accordingly, energy sources physically used to satisfy load 1230 may, for example, be excluded from the depicted energy source profile. In various embodiments, energy source profile 1225 may correspond to total energy sources, to selected impacts of interest (e.g., carbon impact, renewable energy, disaster-resistant generation sources), or some combination thereof. Various embodiments may further provide at least one visual indicium of a location-specific metric such as discussed with reference to metric 1055 of FIG. 10. Accordingly, various embodiments may advantageously provide a user with visual indicia suitable for quick visual analysis of an energy source profile corresponding to (time-matched) energy consumption and generation profiles.

Figure 13:
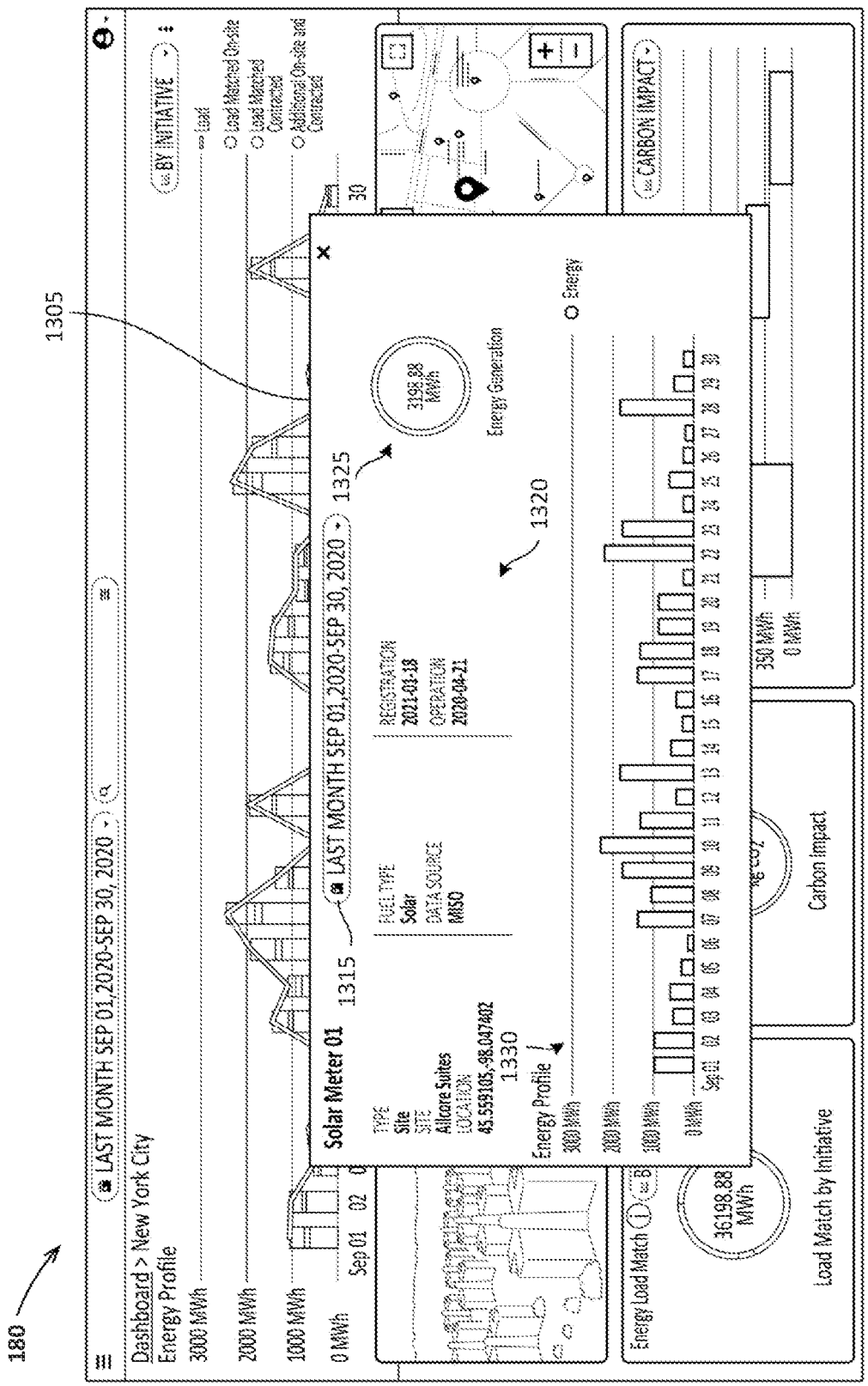
FIG. 13 depicts an exemplary time-matched energy source profile display, such as shown in FIG. 12, displaying energy correlating to individual energy generation data records (EGDRs) for a specific consumption meter of a particular location.

FIG. 13 depicts an exemplary time-matched energy source profile display, such as shown in FIG. 12, displaying energy correlating to individual energy generation data records (EGDRs) for a specific consumption meter of a particular location. The visual indicia 180 may, for example, include visual indicia of facility-specific energy source profile(s) such as discussed with reference to FIG. 12. The visual indicia 180 further includes an overlay display 1305 providing visual indicia of partially-time aggregated data from a specific generation data source. In the depicted example, the data source corresponds to an on-site generation meter ("Solar Meter 01") providing time-matched energy generation data (e.g., received and transformed into EGDRs). The on-site time-matched energy generation data may, for example, correspond to energy included in time-matched on-site energy indicia such as, by way of example and not limitation, time-matched on-site generation 1235 of FIG. 12 and on-site energy 1025 of FIG. 10.

As depicted, the overlay display 1305 includes time range display (e.g., user selection input) 1315, visual indicia of aggregated energy generated 1325 over the time range shown in display 1315, and source information display 1320 (e.g., data type, site, fuel type, data source, registration date, beginning operation date). The overlay display further includes an energy generation profile 1330. The energy generation profile provides visual indicia of energy generation from the source aggregated by defined time increments (e.g., by day, as depicted). In various embodiments the profile 1330 may be an energy consumption profile, energy generation profile, or some combination thereof.

In various embodiments data for the profile 1330 may correspond only to energy matched with at least one facility of interest. For example, the profile 1330 may display an energy generation profile corresponding to energy generated by a remote source (e.g., a wind farm, a coal plant) and matched to the location(s) currently active in the display. The profile 1330 may, for example, exclude energy not matched to the location(s) but generated by the corresponding facility and/or received from the data source (e.g., a meter). Accordingly, a user may advantageously visually analyze and/or identify sources of energy and/or consumption.

Figure 14:
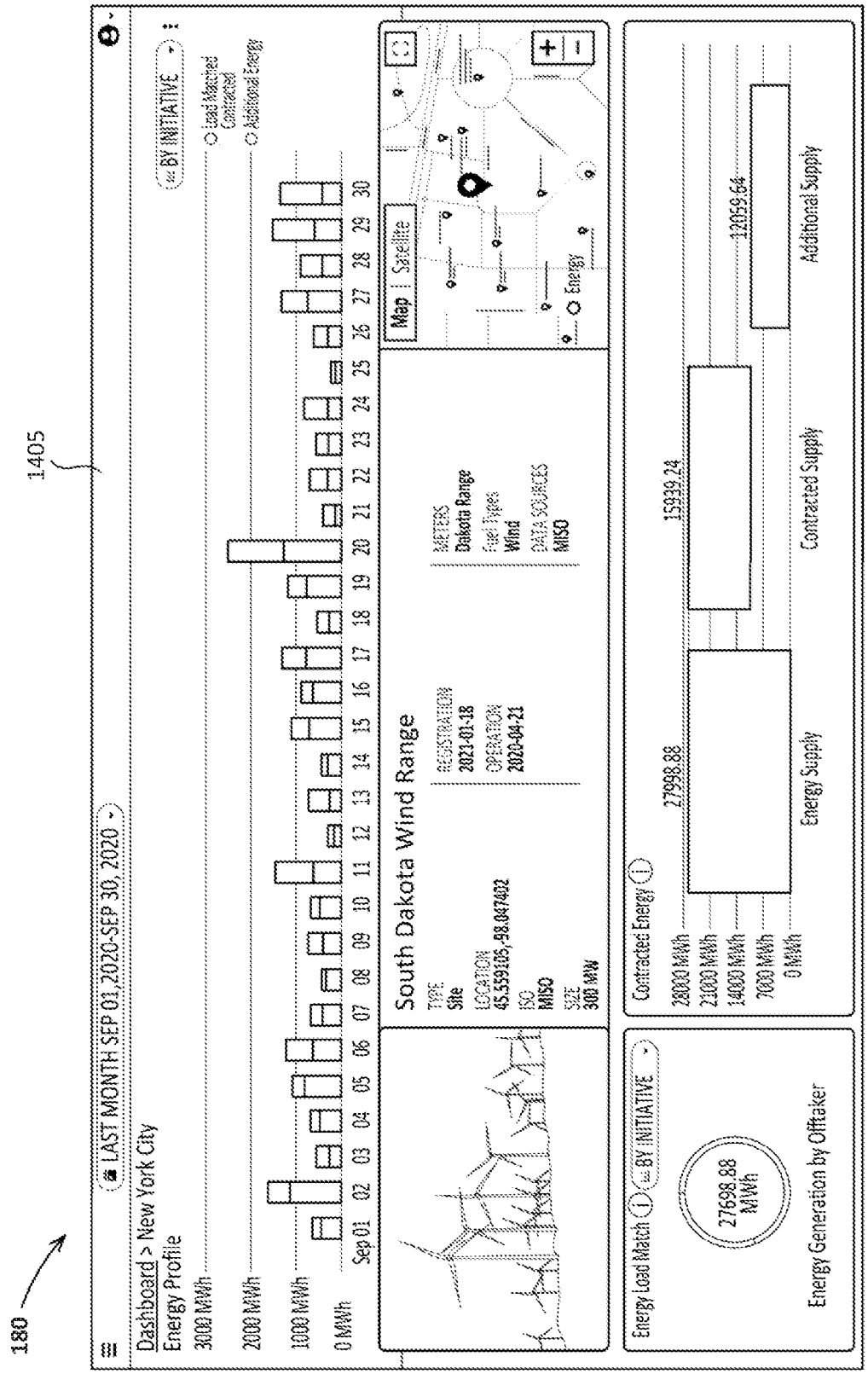
FIG. 14 depicts an exemplary aggregated energy generation display for an energy generator.

FIG. 14 depicts an exemplary aggregated energy generation display for an energy generator. The visual indicia 180 includes a display 1405 of visual indicia corresponding to the generation profile(s) for a specific energy generation facility. As depicted, the display 1405 includes information on the energy generation facility; visual indicia of aggregate energy generation over a time range, aggregate energy source profile indicated total energy supply for the location, associated contracted supply matched to the location, and additional uncontracted (e.g., unutilized) supply available from that location over the time range; and an energy source profile indicating per-time interval (e.g., aggregated by day) energy generation and additional supply. Various embodiments may advantageously provide a user with a display suitable for quickly visually assessing location-matched and/or time-matched energy source profiles (generation and/or consumption) for one or more energy generation facilities.

Although various embodiments have been described with reference to the figures, other embodiments are possible. For example, although an exemplary system has been described with reference to FIGS. 1-14, other implementations may be deployed in other industrial, scientific, medical, commercial, and/or residential applications. In various embodiments, for example, tracking and processing infrastructure systems may be advantageously implemented in environments not limited to and/or not including energy transfer. In various implementations, tracking and processing infrastructure may be advantageously configured for use with, by way of example and not limitation, conventional energy infrastructures (e.g., natural gas, crude and refined oil and oil products, alternating current and/or direct current electric networks), discrete tangible assets, environmental attributes (e.g., water quality, air quality, pollution), airborne substances, waterborne substances, mined and/or extracted substances, virtual assets, physical phenomena motion/transmission (e.g., air/sea/space/land/electronic traffic), various transactions, physical and/or virtual traffic, network usage, tracking and/or transfer various physical phenomena, or some combination thereof.

Accordingly, various embodiments may implement physical phenomena data records (PPDR). In various embodiments EGDRs and/or ECDRs may be implemented as a subset of PPDRs. PPDRs may, by way of example and not limitation, track generation, consumption, transportation, scheduling, transmission, conveyance, flow, storage, and/or other transactions/activities related to various physical phenomena. For example, various implementations may advantageously track air quality. A PPDR may, for example, represent a unit of air (e.g., volume, mass, mole, weight) improved and/or otherwise "generated." The PPDR may, for example, be generated from an air improvement (e.g., filtering, 'green processing' such as by vegetation) data stream. A corresponding physical phenomena profile may, for example, then be matched against one or more PPDRs. For example, one or more air pollution profiles may be matched against the PPDRs. In various implementations, profiles may, by way of example and not limitation, be matched by time, location, activity, physical phenomena, other appropriate correlation, or some combination thereof.

In various embodiments, PPDRs may be implemented, by way of example and not limitation, for extraction of substances (e.g., petroleum, natural gas, water, coal, heavy metals, rare earth substances, precious metals), refinement of substances (e.g., hydrocarbon compositions, petrochemicals, other chemical compositions), manufacturing (e.g., manufacturing of items, processing), or some combination thereof. Various embodiments may be configured to track a plurality of different physical phenomena using one or more unique PPDR structures. For example, EGDRs may be implemented corresponding to natural gas, fossil fuels, electricity, hydrogen fuel, other appropriate energy-related physical phenomena, or some combination thereof. In various embodiments, by way of example and not limitation, PPDRs may relate to consumption, and profiles of generation, transmission, and/or other activities/metrics may be matched to corresponding PPDRs. Accordingly, various embodiments may advantageously provide accurate and precise tracking and processing of one or more physical phenomena quanta across one or more distributed networks.

In various embodiments EGDRs and consumption data records may have different time increments. In an illustrative example, an EGDR may, by way of example and not limitation, be generated from a generation data stream (e.g., generation data stream 135A) from a metering device (e.g., generation meter 135) reporting generation data in five-minute increments. Consumption data may, for example, correspond to a consumption data stream (e.g., consumption data streams 145A) from a metering device (e.g., consumption meter 145) reporting in hourly increments. Transmission data may, for example, correspond to a transmission data stream (e.g., transmission data stream 140A) from a metering device (e.g., transmission metering engine 140) reporting in daily increments. Matching of the consumption profile(s) (e.g., consumption profile 170A/consumption profile 170B) to the generation profile(s) (e.g., the generation profile 160) may, by way of example and not limitation, be performed as disclosed at least with reference to FIGS. 1-9. EGDRs generated from the generation data may accordingly correspond to five-minute increments of time, while the consumption data corresponds to hourly increments of time. The dynamic and selective matching process (e.g., performed by processing and validation engine 415) may select EGDRs from multiple time increments corresponding to a specific time increment in the consumption profile. In a particular illustrative example, a consumption profile increment corresponding to 8:00 AM to 9:00 AM on a specific day may be matched, by way of example and not limitation, to EGDRs corresponding to energy generation in any of the five-minute increments between 8:00 AM and 9:00 AM on that specific day. Vice versa, in various implementations, a single EGDR may be matched to multiple time increments of consumption data.

In various embodiments generation records (e.g., EGDRs) and consumption records may be matched in various relationships including, by way of example and not limitation, one-to-one, one-to-many, many-to-one, or some combination thereof. The generation records and/or the consumption records may be stored as individual hashes representing corresponding energy quanta in time in a data store such as, for example, a Merkle trie. Relationships between energy generation records and consumption records created, for example, during profile matching operations (e.g., as described in relation to FIGS. 1-9) may be stored has tags associated with records on a Merkle trie, a blockchain, a supplementary data store, or some combination thereof. Tags may be stored alongside energy generation (e.g., EGDRs) and/or consumption records, in a separate data structure associated by pointers or other reference means, or some combination thereof. Accordingly, energy generation profiles and energy consumption profiles may be advantageously accurately and completely matched.

In various embodiments digital energy assets (e.g., digital energy asset 175) may correspond to unallocated energy generation and/or consumption. For example, all energy generated for a particular entity but not consumed thereby may be converted (e.g., as described in relation to FIGS. 7-8) into corresponding digital RECs (e.g., in predetermined energy quantum bundles). Energy consumed but not accounted for by generation may be converted, for example, into corresponding negative digital assets. In various embodiments, by way of example and not limitation, digital RECs may correspond to predetermined time periods. For example, digital RECs may be generated from available, unallocated energy generated during time periods corresponding to a particular network load level and/or energy availability level. In various embodiments, the time periods may be predetermined, may be dynamically determined, may be user defined, or some combination thereof. Accordingly, by way of example and not limitation, economical digital energy assets (e.g., digital RECs corresponding to energy generated during "off-peak" times), valuable digital energy assets (e.g., digital RECs corresponding to energy generated during "on-peak" times), or some combination thereof may be generated and traded.

In various embodiments a user may interact with a user interface (UI) (e.g., visual indicia 180 as discussed at least with reference to FIGS. 1 and 9-14) to further access various source profile related displays and/or metrics other than shown herein. For example, users may view, by way of example and not limitation, by entire portfolio (e.g., generation and/or consumption), region, city, site, meter, other appropriate location, or some combination thereof. Users may view, by way of example and not limitation, by all-time, year, month, day, hour, minute, other appropriate time interval, or some combination thereof.

In various embodiments, for example, various UIs may receive input from a user which may cause at least one computer processor to retrieve, transform, and generate a display of data relating to, by way of example and not limitation, generation, consumption, impacts (e.g., carbon footprint, temperature effects, weather effects, pollution effects), locations (e.g., geographical region, distribution zone, facility), time span(s), time increment(s), or some combination thereof. Various embodiments may relate to energy generated, transmitted, stored, and/or utilized in the form of, by way of example and not limitation, electricity, steam, batteries, fuel cells, or some combination thereof.

Various embodiments may apply one or more sets of predetermined rules for display, attribution, load matching, impacts, initiatives, or some combination thereof. For example, some embodiments may apply predetermined rules for carbon intensity determination. In an illustrative example, an energy generation facility and energy consumption facility may be geographically separated. Consumption and generation records may be time- and location-matched (e.g., "x" MWh of generation from the generation facility delivered to a distribution zone serving the energy consumption facility during hour "y" of day "z"). However, carbon intensity may not be matched, even if the consumption and generation records are in the same time zone, distribution zone, or some combination thereof. Accordingly, various rules may be applied to determine a level of carbon intensity and/or carbon intensity offset at two different locations at a corresponding time. Such rules may, for example, implement average carbon intensity in which geographical disparity may be neglected if two locations are at least in an identical ISO region, for example.

In various embodiments rules may, for example, implement marginal emissions in which (carbon) intensity is determined for the actual location, regardless of ISO zone. The intensity may, for example, relate to current operating capacity, turbine speed, other emissions and/or environmental impacting factor, or some combination thereof. Various embodiments may, by way of example and not limitation, implement rules applying at least one of marginal emissions, average emissions intensity, other appropriate determination, or some combination thereof. Various such embodiments may, for example, enforce that rules corresponding to one set of emission may be used for a specific geographical region, specific contract (e.g., pair of generation facility+consumption facility), or some combination thereof. Various such embodiments may, for example, enforce (predetermined) rules corresponding to legislatively-defined emission rates that must be used for a specific geographical region (e.g., Local Law 97 as promulgated by New York City).

Various embodiments may be configured to apply predetermined rules to identify regions of intensity of one or more factors of interest in a group of locations. Factors of interest may include, by way of example and not limitation, generation shortfall as compared to consumption, shortfall and/or excess of one or more types of energy generation (e.g., shortfall of time-matched on-site and/or time-matched contracted energy), excess energy consumption during specific time periods (e.g., weekdays, mid-day time), carbon footprint, other (measures of) emissions, or some combination thereof. Various embodiments may be configured to generate visual indicia corresponding to regions of intensity of the factor(s) of interest such as, for example, color coding, alerts, pop-ups, map displays, or some combination thereof.

In various embodiments, some bypass circuit implementations may be controlled in response to signals from analog or digital components, which may be discrete, integrated, or a combination of each. Some embodiments may include programmed, programmable devices, or some combination thereof (e.g., PLAs, PLDs, ASICs, microcontroller, microprocessor), and may include one or more data stores (e.g., cell, register, block, page) that provide single or multi-level digital data storage capability, and which may be volatile, non-volatile, or some combination thereof. Some control functions may be implemented in hardware, software, firmware, or a combination of any of them.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

Although an example of a system, which may be portable, has been described with reference to the above figures, other implementations may be deployed in other processing applications, such as desktop and networked environments.

Temporary auxiliary energy inputs may be received, for example, from chargeable or single use batteries, which may enable use in portable or remote applications. Some embodiments may operate with other DC voltage sources, such as a 9V (nominal) battery, for example. Alternating current (AC) inputs, which may be provided, for example from a 50/60 Hz power port, or from a portable electric generator, may be received via a rectifier and appropriate scaling. Provision for AC (e.g., sine wave, square wave, triangular wave) inputs may include a line frequency transformer to provide voltage step-up, voltage step-down, and/or isolation.

Although particular features of an architecture have been described, other features may be incorporated to improve performance. For example, caching (e.g., L1, L2, . . . ) techniques may be used. Random access memory may be included, for example, to provide scratch pad memory and or to load executable code or parameter information stored for use during runtime operations. Other hardware and software may be provided to perform operations, such as network or other communications using one or more protocols, wireless (e.g., infrared) communications, stored operational energy and power supplies (e.g., batteries), switching and/or linear power supply circuits, software maintenance (e.g., self-test, upgrades), and the like. One or more communication interfaces may be provided in support of data storage and related operations.

Some systems may be implemented as a computer system that can be used with various implementations. For example, various implementations may include digital circuitry, analog circuitry, computer hardware, firmware, software, or combinations thereof. Apparatus can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Various embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits).

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. Various embodiments may be implemented in a computer system that includes a graphical user interface and/or an Internet browser. To provide for interaction with a user, some implementations may be implemented on a computer having a display device, such as a CRT (cathode ray tube) or LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, the computers and networks forming the Internet, or some combination thereof. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g, Wi-Fi, Ethernet, IrDA, FDDI (fiber distributed data interface), token-ring networks, multiplexing techniques based on frequency, time, or code division, or some combination thereof. Some implementations may optionally incorporate features such as error checking and correction (ECC) for data integrity, or security measures, such as encryption (e.g., WEP) and password protection.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Various examples of modules may be implemented using circuitry, including various electronic hardware. By way of example and not limitation, the hardware may include transistors, resistors, capacitors, switches, integrated circuits, other modules, or some combination thereof. In various examples, the modules may include analog logic, digital logic, discrete components, traces and/or memory circuits fabricated on a silicon substrate including various integrated circuits (e.g., FPGAs, ASICs), or some combination thereof. In some embodiments, the module(s) may involve execution of preprogrammed instructions, software executed by a processor, or some combination thereof. For example, various modules may involve both hardware and software.

In an illustrative aspect, a computer program product may include a program of instructions tangibly embodied on at least one non-transitory computer readable medium. When the instructions are executed on a processor, the processor may cause operations to be performed to automatically indicate environmental impact of consumption of energy physically generated and transmitted to a consumption location across at least one tracking and processing infrastructure. The operations may include receive a signal associated with a request for environmental impact associated with a predetermined digital record of a first quantum of energy consumed in a selected time interval at a first consumption location. The operations may include, in response to receiving the signal, retrieve, by the processor from a first data store, the predetermined digital record of the first quantum of energy consumed. The operations may include associate, by the processor, the digital record of the first quantum of energy consumed with a second quantum of energy generated at a generation location and a third quantum of energy transmitted via a physical transmission link during the selected time interval. The operations may include verify, by the processor, that the consumption location is associated with a second predetermined privilege to consume the third quantum of energy as a function of a first predetermined privilege to consume associated with the second quantum of energy generated and the first consumption location. The operations may include generate and store, by the processor, a first digital association between the first quantum of energy, the second quantum of energy, the third quantum of energy, the first predetermined privilege to consume, and the second predetermined privilege to consume. The operations may include determine, by the processor, an environmental impact indicium (EII) as a function of at least one predetermined environmental impact criterion applied to a comparison between the first quantum of energy consumed, the second quantum of energy generated, and the third quantum of energy transmitted. The operations may include associate the EII, by the processor, with the first digital association. The EII may represent an environmental impact of the consumption location based at least partially on actual generation location of energy consumed by the physical consumption location.

The physical transmission link may include at least one physical energy delivery and scheduling network operated by at least one transmission system operator. The second quantum of energy may be the third quantum of energy. The physical transmission link connecting the generation location and the consumption location may be operated by a single transmission system operator. The physical transmission link connecting the generation location and the consumption location may be operated by multiple transmission system operators.

The digital record of the first quantum of energy may be generated in response to a signal from a metering device measuring energy consumed by the consumption location.

The operations may further include associate a digital record of a fourth quantum of energy consumed at a second consumption location to the second quantum of energy generated. The operations may include verify that the fourth quantum of energy consumed is associated with a third predetermined privilege to consume the second quantum of energy generated. The operations may include generate a human-readable visual indicium representing the EII.

In an illustrative aspect, a computer-implemented method may be performed by at least one processor to automatically indicate environmental impact of consumption of energy physically generated and transmitted to a consumption location across at least one tracking and processing infrastructure. The method may include receive a signal associated with a request for environmental impact associated with a predetermined digital record of a first quantum of energy consumed in a selected time interval at a first consumption location. The method may include, in response to receiving the signal, retrieve, by the processor from a first data store, the predetermined digital record of the first quantum of energy consumed. The method may include associate, by the processor, the digital record of the first quantum of energy consumed with a second quantum of energy generated at a generation location and a third quantum of energy transmitted via a physical transmission link during the selected time interval. The method may include verify, by the processor, that the consumption location is associated with a second predetermined privilege to consume the third quantum of energy as a function of a first predetermined privilege to consume associated with the second quantum of energy generated and the first consumption location. The method may include generate and store, by the processor, a first digital association between the first quantum of energy, the second quantum of energy, the third quantum of energy, the first predetermined privilege to consume, and the second predetermined privilege to consume.

The method may include determine, by the processor, an environmental impact indicium (EII) as a function of at least one predetermined environmental impact criterion applied to a comparison between the first quantum of energy consumed, the second quantum of energy generated, and the third quantum of energy transmitted. The method may include associate the EII, by the processor, with the first digital association. The EII may represent the environmental impact of the consumption location based at least partially on actual generation location of energy consumed by the physical consumption location.

The method may include generate a human-readable visual indicium representing the EII. The human-readable visual indicium may be generated as a function of a total consumption of the physical location during the selected time interval relative to the first quantum of energy consumed and associated with the second quantum of energy generated and the third quantum of energy transmitted.

The physical transmission link may include at least one physical energy delivery and scheduling network operated by at least one transmission system operator. The second quantum of energy may be the third quantum of energy. The physical transmission link connecting the generation location and the consumption location may be operated by a single transmission system operator. The physical transmission link connecting the generation location and the consumption location may be operated by multiple transmission system operators.

The digital record of the first quantum of energy may be generated in response to a signal from a metering device measuring energy consumed by the consumption location.

The method may include associate a digital record of a fourth quantum of energy consumed at a second consumption location to the second quantum of energy generated. The method may include verify that the fourth quantum of energy consumed is associated with a third predetermined privilege to consume the second quantum of energy generated.

Associate the digital record of the fourth quantum of energy may include, when the fourth quantum of energy and the first quantum of energy together exceed at least one of the third quantum of energy and the second quantum of energy, and when a priority of the first predetermined privilege is greater than a priority of the third predetermined privilege, then: associate a portion of the second quantum of energy, the portion of the second quantum of energy being a portion of the second quantum exceeding the first quantum of energy, with the fourth quantum of energy.

In an illustrative aspect, a system may include a data store including a program of instructions. The system may include a processor operably coupled to the data store such that, when the processor executes the program of instructions, the processor causes operations to be performed to automatically indicate environmental impact of consumption of energy physically generated and transmitted to a consumption location across at least one tracking and processing infrastructure. The operations may include receive a signal associated with a request for environmental impact associated with a predetermined digital record of a first quantum of energy consumed in a selected time interval at a first consumption location. The operations may include, in response to receiving the signal, retrieve, by the processor from a first data store, the predetermined digital record of the first quantum of energy. The operations may include associate, by the processor, the digital record of the first quantum of energy consumed with a second quantum of energy generated at a generation location and a third quantum of energy transmitted via a physical transmission link during the selected time interval. The operations may include verify, by the processor, that the consumption location is associated with a second predetermined privilege to consume the third quantum of energy as a function of a first predetermined privilege to consume associated with the second quantum of energy generated and the first consumption location. The operations may include generate and store, by the processor, a first digital association between the first quantum of energy, the second quantum of energy, the third quantum of energy, the first predetermined privilege to consume, and the second predetermined privilege to consume.

The operations may include determine, by the processor, an environmental impact indicium (EII) as a function of at least one predetermined environmental impact criterion applied to a comparison between the first quantum of energy consumed, the second quantum of energy generated, and the third quantum of energy transmitted. The operations may include associate the EII, by the processor, with the first digital association. The EII may represent an environmental impact of the consumption location based at least partially on actual generation location of energy consumed by the physical consumption location.

The operations may include generate a human-readable visual indicium representing the EII. The human-readable visual indicium may be generated as a function of a total consumption of the physical location during the selected time interval relative to the first quantum of energy consumed and associated with the second quantum of energy generated and the third quantum of energy transmitted.

The physical transmission link may include at least one physical energy delivery and scheduling network operated by at least one transmission system operator. The second quantum of energy may be the third quantum of energy. The physical transmission link connecting the generation location and the consumption location may be operated by a single transmission system operator. The physical transmission link connecting the generation location and the consumption location may be operated by multiple transmission system operators.

The digital record of the first quantum of energy may be generated in response to a signal from a metering device measuring energy consumed by the consumption location.

The operations may include associate a digital record of a fourth quantum of energy consumed at a second consumption location to the second quantum of energy generated. The operations may include verify that the fourth quantum of energy consumed is associated with a third predetermined privilege to consume the second quantum of energy generated.

Associate the digital record of the fourth quantum of energy may include, when the fourth quantum of energy and the first quantum of energy together exceed at least one of the third quantum of energy and the second quantum of energy, and when a priority of the first predetermined privilege is greater than a priority of the third predetermined privilege, then: associate a portion of the second quantum of energy, the portion of the second quantum of energy being a portion of the second quantum exceeding the first quantum of energy, with the fourth quantum of energy.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A computer program product comprising at least one non-transitory computer readable medium tangibly embodying a program of instructions wherein, when the instructions are executed on a processor, the processor causes operations to be performed to automatically indicate environmental impact of consumption of energy physically generated and transmitted to a consumption location across at least one tracking and processing infrastructure, the operations comprising:

receive a signal associated with a request for environmental impact associated with a predetermined digital record of a first quantum of energy consumed in a selected time interval at a first consumption location;

in response to receiving the signal, retrieve, by the processor from a first data store, the predetermined digital record of the first quantum of energy consumed;

associate, by the processor, the digital record of the first quantum of energy consumed with a second quantum of energy generated at a generation location and a third quantum of energy transmitted via a physical transmission link during the selected time interval;

retrieve, by the processor, a first predetermined privilege to consume associated with the second quantum of energy generated and the first consumption location, and a second predetermined privilege to consume the third quantum of energy;

verify, by the processor, that the consumption location is associated with the second predetermined privilege to consume as a function of the first predetermined privilege to consume;

generate and store, by the processor, a first digital association between the first quantum of energy, the second quantum of energy, the third quantum of energy, the first predetermined privilege to consume, and the second predetermined privilege to consume;

determine, by the processor, an environmental impact indicium (EII) as a function of at least one predetermined environmental impact criterion applied to a comparison between the first quantum of energy consumed, the second quantum of energy generated, and the third quantum of energy transmitted; and, associate the EII, by the processor, with the first digital association, wherein the EII represents the environmental impact of the consumption location based at least partially on actual generation location of energy consumed by the consumption location.

2. The computer program product of claim 1, wherein the physical transmission link comprises at least one physical energy delivery and scheduling network operated by at least one transmission system operator.

3. The computer program product of claim 1, wherein the second quantum of energy is the third quantum of energy.

4. The computer program product of claim 3, wherein the physical transmission link connecting the generation location and the consumption location is operated by a single transmission system operator.

5. The computer program product of claim 1, wherein the digital record of the first quantum of energy is generated in response to a signal from a metering device measuring energy consumed by the consumption location.

6. The computer program product of claim 1, the operations further comprising:

associate a digital record of a fourth quantum of energy consumed at a second consumption location to the second quantum of energy generated.

7. The computer program product of claim 6, the operations further comprising:

verify that the fourth quantum of energy consumed is associated with a third predetermined privilege to consume the second quantum of energy generated.

8. The computer program product of claim 1, the operations further comprising:

generate a human-readable visual indicium representing the EII.

9. A computer-implemented method performed by at least one processor to automatically indicate environmental impact of consumption of energy physically generated and transmitted to a consumption location across at least one tracking and processing infrastructure, the method comprising:
    receive a signal associated with a request for environmental impact associated with a predetermined digital record of a first quantum of energy consumed in a selected time interval at a first consumption location;
    in response to receiving the signal, retrieve, by the processor from a first data store, the predetermined digital record of the first quantum of energy consumed;
    associate, by the processor, the digital record of the first quantum of energy consumed with a second quantum of energy generated at a generation location and a third quantum of energy transmitted via a physical transmission link during the selected time interval;
    retrieve, by the processor, a first predetermined privilege to consume associated with the second quantum of energy generated and the first consumption location, and a second predetermined privilege to consume the third quantum of energy;
    verify, by the processor, that the consumption location is associated with the second predetermined privilege to consume as a function of the first predetermined privilege to consume;
    generate and store, by the processor, a first digital association between the first quantum of energy, the second quantum of energy, the third quantum of energy, the first predetermined privilege to consume, and the second predetermined privilege to consume;
    determine, by the processor, an environmental impact indicium (EII) as a function of at least one predetermined environmental impact criterion applied to a comparison between the first quantum of energy consumed, the second quantum of energy generated, and the third quantum of energy transmitted; and,
    associate the EII, by the processor, with the first digital association,
    wherein the EII represents the environmental impact of the consumption location based at least partially on actual generation location of energy consumed by the consumption location.

10. The method of claim 9, further comprising:
    generate a human-readable visual indicium representing the EII.

11. The method of claim 10, wherein the human-readable visual indicium is generated as a function of a total consumption of the physical location during the selected time interval relative to the first quantum of energy consumed and associated with the second quantum of energy generated and the third quantum of energy transmitted.

12. The method of claim 9, wherein the physical transmission link comprises at least one physical energy delivery and scheduling network operated by at least one transmission system operator.

13. The method of claim 9, wherein the second quantum of energy is the third quantum of energy.

14. The method of claim 13, wherein the physical transmission link connecting the generation location and the consumption location is operated by a single transmission system operator.

15. The method of claim 9, wherein the digital record of the first quantum of energy is generated in response to a signal from a metering device measuring energy consumed by the consumption location.

16. The method of claim 9, further comprising:
    associate a digital record of a fourth quantum of energy consumed at a second consumption location to the second quantum of energy generated.

17. The method of claim 16, further comprising:
    verify that the fourth quantum of energy consumed is associated with a third predetermined privilege to consume the second quantum of energy generated.

18. The method of claim 17, wherein associate the digital record of the fourth quantum of energy comprises:
    when the fourth quantum of energy and the first quantum of energy together exceed at least one of the third quantum of energy and the second quantum of energy, and when a priority of the first predetermined privilege is greater than a priority of the third predetermined privilege, then:
        associate a portion of the second quantum of energy, the portion of the second quantum of energy being a portion of the second quantum exceeding the first quantum of energy, with the fourth quantum of energy.

19. The method of claim 9, wherein the first predetermined privilege comprises at least one predetermined energy consumption time, at least one predetermined quantum of energy, and an entity associated with a predetermined consumption location.

20. A system comprising:
    a data store comprising a program of instructions; and,
    a processor operably coupled to the data store such that, when the processor executes the program of instructions, the processor causes operations to be performed to automatically indicate environmental impact of consumption of energy physically generated and transmitted to a consumption location across at least one tracking and processing infrastructure, the operations comprising:
    receive a signal associated with a request for environmental impact associated with a predetermined digital record of a first quantum of energy consumed in a selected time interval at a first consumption location;
    in response to receiving the signal, retrieve, by a processor from a first data store, the predetermined digital record of the first quantum of energy;
    associate, by the processor, the digital record of the first quantum of energy consumed with a second quantum of energy generated at a generation location and a third quantum of energy transmitted via a physical transmission link during the selected time interval;
    retrieve, by the processor, a first predetermined privilege to consume associated with the second quantum of energy generated and the first consumption location, and a second predetermined privilege to consume the third quantum of energy;
    verify, by the processor, that the consumption location is associated with the second predetermined privilege to consume as a function of the first predetermined privilege to consume;
    generate and store, by the processor, a first digital association between the first quantum of energy, the second quantum of energy, the third quantum of energy, the first predetermined privilege to consume, and the second predetermined privilege to consume;
    determine, by the processor, an environmental impact indicium (EII) as a function of at least one predetermined environmental impact criterion applied to a comparison between the first quantum of energy consumed, the second quantum of energy generated, and the third quantum of energy transmitted; and,
associate the EII, by the processor, with the first digital association,
wherein the EII represents the environmental impact of the consumption location based at least partially on actual generation location of energy consumed by the consumption location.

\* \* \* \* \*